United States Patent
Tanabe

(10) Patent No.: US 8,048,336 B2
(45) Date of Patent: Nov. 1, 2011

(54) POLYMERIZABLE CHOLESTERIC LIQUID CRYSTAL COMPOSITION AND ITS USE

(75) Inventor: Mayumi Tanabe, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 0 days.

(21) Appl. No.: 12/761,678

(22) Filed: Apr. 16, 2010

(65) Prior Publication Data

US 2010/0272924 A1 Oct. 28, 2010

(30) Foreign Application Priority Data

Apr. 28, 2009 (JP) ................................. 2009-109320

(51) Int. Cl.
*C09K 19/36* (2006.01)
*C09K 19/38* (2006.01)
*C09K 19/52* (2006.01)

(52) U.S. Cl. .................. 252/299.7; 252/299.01; 428/1.5

(58) Field of Classification Search .............. 252/299.01, 252/299.7; 428/402, 1.5
See application file for complete search history.

(56) References Cited

U.S. PATENT DOCUMENTS

| | | | |
|---|---|---|---|
| 2003/0195367 A1 | 10/2003 | Barrault et al. | |
| 2010/0086506 A1* | 4/2010 | Tanabe | 424/63 |
| 2010/0178508 A1* | 7/2010 | Kasch et al. | 428/402 |

FOREIGN PATENT DOCUMENTS

| | | |
|---|---|---|
| JP | S57-62212 | 4/1982 |
| JP | H3-99094 | 4/1991 |
| JP | H5-310526 | 11/1993 |
| JP | 2006-176422 | 7/2006 |
| JP | 2008-174634 | 7/2008 |
| JP | 2009-227656 | 10/2009 |
| WO | WO 2008000755 A1 * | 1/2008 |

OTHER PUBLICATIONS

Article titled "Mesomorphic Properties of Some Sitosteryl Esters" by Motoc et al., in Molecular crystals and liquid crystals, vol. 53,1979. pp. 69-76.

* cited by examiner

*Primary Examiner* — Shean Wu
(74) *Attorney, Agent, or Firm* — J.C. Patents

(57) ABSTRACT

A polymerizable cholesteric liquid crystal composition in the invention includes at least one compound selected from the group consisting of a polymerizable ester compound (1) having a residue of a hydrolysate of γ-oryzanol (A) and having a ring structure, a polymerizable ester compound (2) having a residue of a hydrolysate of γ-oryzanol (A) and having no ring structures, and a polymerizable ester compound (3) having a residue of a hydrogenated product of γ-oryzanol.

19 Claims, No Drawings

POLYMERIZABLE CHOLESTERIC LIQUID CRYSTAL COMPOSITION AND ITS USE

CROSS-REFERENCE TO RELATED APPLICATION

This application claims the priority benefit of Japan application serial no. JP2009-109320, filed Apr. 28, 2009. The entirety of the above-mentioned patent application is hereby incorporated by reference herein and made a part of specification.

BACKGROUND OF THE INVENTION

1. Field of the Invention

The present invention relates to a cholesteric liquid crystal composition and its use, more particularly to a cholesteric liquid crystal composition and the polymer prepared from the composition that reflect light with wavelengths in a particular range at around room temperature, and their use.

2. Related Art

Cholesteric liquid crystal molecules have a helical structure in their liquid crystal state. Because of this, they reflect circularly polarized light with wavelengths in a particular range, depending on the rotating direction and the pitch length of the helix in the liquid crystal molecules, when the helical structure fixed by the polymerization of the cholesteric liquid crystal molecules is irradiated. For example, light with wavelengths of blue, green, yellow and red depending on the pitch length of liquid crystals is selectively reflected on irradiation with visible light. These color tones are different from those of pigment or dye, in which colors arise from light absorption, and have viewing angle-dependence in which a color tone varies on the basis of viewing angles. Moreover, since the pitch length of the cholesteric liquid crystal molecules can be adjusted according to the temperature and the kind of the compound, not only visible light but also light in the infrared and ultraviolet ranges can be selectively reflected.

Materials that selectively reflect light with various wavelengths in a wide range have been provided by utilizing such characteristics of the cholesteric liquid crystals. For examples, the materials include liquid crystal pigment, coating, spray ink, printing ink, cosmetics, an anti-counterfeit printed matter and an ornament. Use of the materials for an optical film such as a polarizing plate, a compensation plate and a color filter in an optical device such as a liquid crystal display device and a holographic device has been proposed.

An animal-derived raw material (cholesterol) extracted mainly from wool wax has been used for a cholesteric material, and in recent years a plant-derived raw material is attracting attention in consideration of the influence on the environment and the human body. The plant-derived raw material means the components extracted from plant seeds or various parts of plants, and can be obtained, for example, from rice bran, rice bran oil, soybeans, wheat, corn, palms, cottonseed, coleseed or the like. Plant sterol which is amply contained in soybeans, triterpene alcohol derivatives which are obtained from rice bran oil and so forth have been known as a plant-derived raw material having liquid crystallinity.

Acrylic acid ester of β-sitosterol which is extracted industrially from soybeans and so forth has been disclosed in Molecular Crystals and Liquid Crystals, Vol. 53, 69-76 (1979) (non-patent reference No. 1). The article discloses that β-sitosterol has the melting point of 138° C. and no liquid crystal phases, although acrylic ester of cholesterol having a similar structure exhibits a cholesteric phase in the range of 118° C. to 126° C.

JP H3-99094 A (1991) (patent document No. 1) discloses that ester derivatives of triterpene alcohols have a cholesteric phase. However, any derivative has a narrow range of a cholesteric phase, and no examples of compounds that have a cholesteric phase in a wide range at around room temperature are disclosed. Since triterpene alcohols used therein are contained in natural products as a mixture, it is difficult to use the extract as a single compound for industrial use.

JP 2004-504291 A (2004) (patent document No. 2) disclosed esters derived from a long-chain fatty acid and sterols, stanols or triterpene alcohols, as an unsaponifiable matter of plant origin. Although the esters are used for cosmetics and pharmaceuticals, the patent document No. 2 does not suggest any liquid crystallinity.

JP 2006-176422 (2006) (patent document No. 3) discloses that long-chain fatty acid esters of plant sterols or triterpene alcohols, which is sterol esters obtained from rice bran, are used for cosmetics and pharmaceuticals. However, the document does not suggest any liquid crystallinity.

JP H5-310526 A (1993) (document No. 4) discloses γ-oryzanol, which is ferulic acid esters of sterols or triterpene alcohols, and JP S57-62212 A (1982) (document 5) discloses ester derivatives of hydroxybenzoic acid with triterpene alcohols. However, these documents do not describe or suggest any liquid crystallinity.

No patent documents described above refer to the technologies of introducing a polymerizable group into a cholesteric material which is prepared from a plant-derived raw material, and then fixing the cholesteric phase.

The patent documents cited herein are No. 1: JP H3-99094 A (1991); No. 2: JP 2004-504291 A (2004); No. 3: JP 2006-176422 A (2006); No. 4: JP H5-310526 A (1993); and No. 5: JP S57-62212 A (1982).

Non-patent document cited herein is Molecular Crystals and Liquid Crystals, Vol. 53, 69-76 (1979).

SUMMARY OF THE INVENTION

The invention concerns a polymerizable cholesteric liquid crystal composition that includes at least one compound selected from the group consisting of a polymerizable ester compound (1) having a residue of a hydrolysate of γ-oryzanol (A) and having a ring structure, a polymerizable ester compound (2) having a residue of a hydrolysate of γ-oryzanol (A) and having no ring structures, and a polymerizable ester compound (3) having a residue of a hydrogenated product of γ-oryzanol, wherein the γ-oryzanol (A) is a mixture containing at least one of ferulic acid esters of plant sterols and at least one of ferulic acid esters of triterpene alcohols, and the hydrolysate of γ-oryzanol (A) is a mixture containing at least one of plant sterols and at least one of triterpene alcohols.

The invention also concerns a polymer, a film, a color material, and use of the composition and the composition.

DETAILED DESCRIPTION OF THE INVENTION

The invention concerns a liquid crystal composition containing a polymerizable ester compound in which a polymerizable group was introduced into an ester compound having a residue derived from a specific plant sterol derivative, triterpene alcohol derivative, or hydrogenated product, and further concerns a multilayer film and a color material including a polymer prepared from the composition and use of the polymer.

One of the advantages of the invention is to provide a liquid crystal composition having a cholesteric phase at around room temperature or body temperature by use of a plant-derived raw material. Another of the advantages is to adjust reflection colors in the cholesteric reflection band over a wide range from red to purple via green and blue at around room temperature or human body temperature by changing the formulation of the composition. Another of the advantages is to form a film having the cholesteric liquid crystal phase directly on a substrate for cholesteric liquid crystals, and then to fix the cholesteric phase.

The invention includes the following items.

Item 1. A polymerizable cholesteric liquid crystal composition that includes at least one compound selected from the group consisting of a polymerizable ester compound (1) having a residue of a hydrolysate of γ-oryzanol (A) and having a ring structure, a polymerizable ester compound (2) having a residue of a hydrolysate of γ-oryzanol (A) and having no ring structures, and a polymerizable ester compound (3) having a residue of a hydrogenated product of γ-oryzanol, wherein the γ-oryzanol (A) is a mixture containing at least one of ferulic acid esters of plant sterols and at least one of ferulic acid esters of triterpene alcohols, and the hydrolysate of γ-oryzanol (A) is a mixture containing at least one of plant sterols and at least one of triterpene alcohols.

Item 2. The polymerizable cholesteric liquid crystal composition according to item 1, wherein the polymerizable ester compound (1) is represented by the following formula (B1), the polymerizable ester compound (2) is represented by the following formula (B2), and the polymerizable ester compound (3) is represented by the following formula (B3);

P—X—(Z-Q)$_m$-COO-T    (B1)

wherein T is a residue of the hydrolysate of γ-oryzanol (A); Q is 1,4-cyclohexylene, 1,4-phenylene or 1,3-phenylene; Z is a single bond, —COO—, —OCO— or —OCOO—; m is an integer of 1 to 3, and a plurality of Q may be the same or different and a plurality of Z may be the same or different when m is 2 or 3; X is a single bond or alkylene having 1 to 20 carbons and an arbitrary —CH$_2$— in the alkylene may be replaced by —O—; and P is a polymerizable group represented by any one of the following formulas (P1) to (P3):

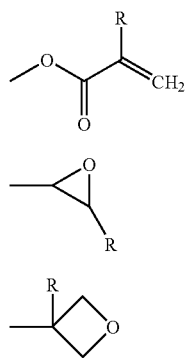

wherein R is hydrogen or alkyl having 1 to 3 carbons;

P—X—Y—COO-T    (B2)

wherein T, X and P have the meanings identical to those described in formula (B1) above and Y is a single bond or —O—;

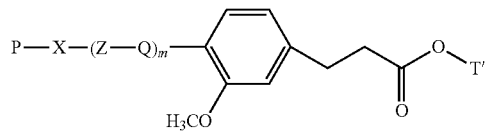

(B3)

wherein Q, Z, X and P have the meanings identical to those described in formula (B1) above and T' is a residue of the hydrogenated product of γ-oryzanol (A).

Item 3. The polymerizable cholesteric liquid crystal composition according to item 1 or 2, including at least two compounds selected from the group of the polymerizable ester compound (1), the polymerizable ester compound (2) and the polymerizable ester compound (3).

Item 4. The polymerizable cholesteric liquid crystal composition according to any one of items 1 to 3, including the polymerizable ester compound (1) and the polymerizable ester compound (2).

Item 5. The polymerizable cholesteric liquid crystal composition according to item 2, wherein it includes the polymerizable ester compound (1) and the polymerizable ester compound (2), and Q in formula (B1) is 1,4-phenylene.

Item 6. The polymerizable cholesteric liquid crystal composition according to item 5, wherein X in formula (B2) is alkylene having 2 to 9 carbons.

Item 7. The polymerizable cholesteric liquid crystal composition according to any one of items 1 to 6, wherein the γ-oryzanol (A) is a mixture containing at least one of compounds represented by the following formula (a1) and at least one of compounds represented by the following formula (a2):

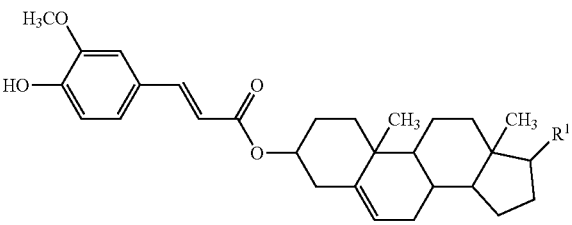

(a1)

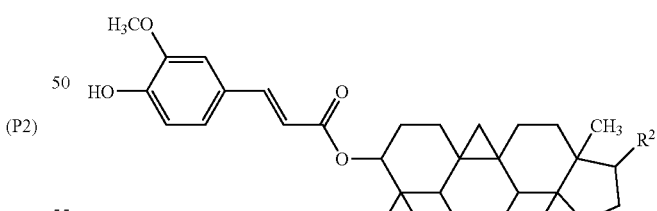

(a2)

wherein $R^1$ is branched-chain alkyl or alkenyl having 9 or 10 carbons and $R^2$ is branched-chain alkyl or alkenyl having 8 or 9 carbons.

Item 8. The polymerizable cholesteric liquid crystal composition according to any one of items 1 to 7, wherein the hydrolysate of γ-oryzanol (A) is a mixture containing at least one of plant sterols selected from the group of the following formulas (a1-1) to (a1-4) and at least one of triterpene alcohols selected from the group of the following formulas (a2-1) to (a2-4).

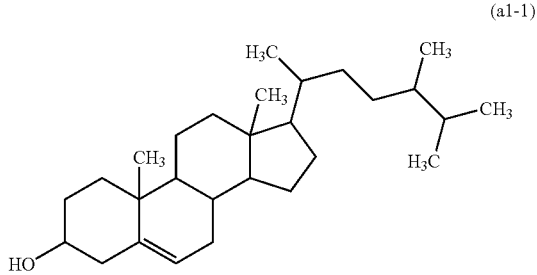
(a1-1)

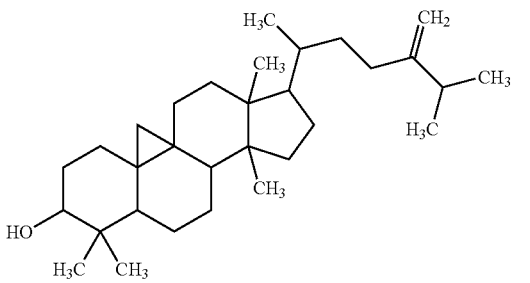
(a2-2)

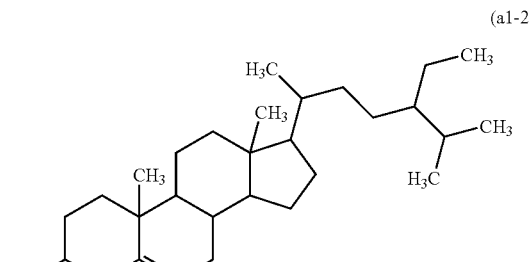
(a1-2)

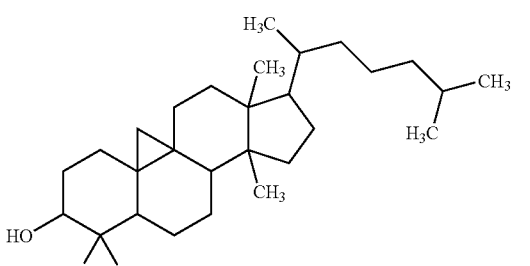
(a2-3)

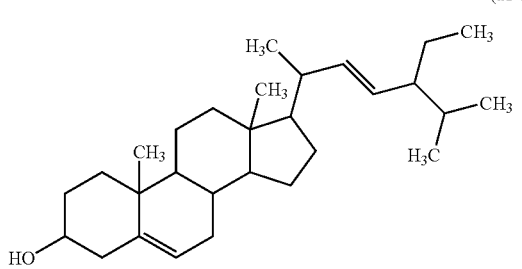
(a1-3)

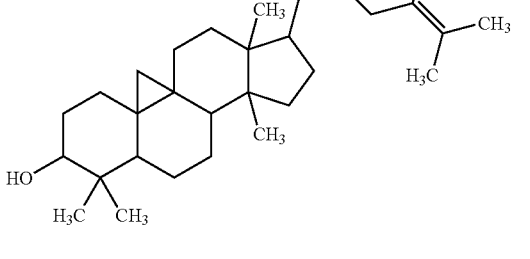
(a2-4)

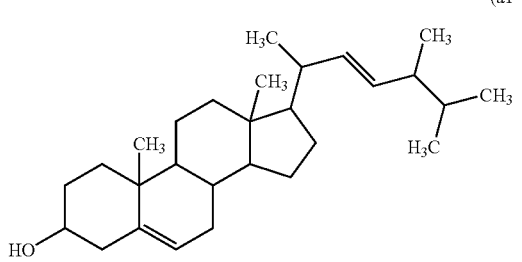
(a1-4)

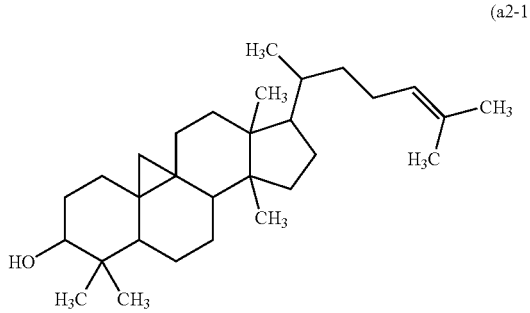
(a2-1)

Item 9. The polymerizable cholesteric liquid crystal composition according to anyone of items 1 to 8, further including a polymerizable liquid crystal compound other than the polymerizable ester compounds (1), (2) and (3).

Item 10. The polymerizable cholesteric liquid crystal composition according to anyone of items 1 to 9, further including a non-liquid crystalline polymerizable compound.

Item 11. The polymerizable cholesteric liquid crystal composition according to item 10, wherein the non-liquid crystalline polymerizable compound is at least one compound selected from the group consisting of a monofunctional (meth)acrylic monomer, a monofunctional (meth)acrylic oligomer, a polyfunctional (meth)acrylic monomer and a polyfunctional (meth)acrylic oligomer.

Item 12. A polymer formed by means of polymerization of a polymerizable cholesteric liquid crystal composition according to any one of items 1 to 11.

Item 13. The polymer according to item 12 that exhibits a cholesteric liquid crystal phase.

Item 14. A film that includes the polymer according to item 12 or 13.

Item 15. A multilayer film formed by laminating a plurality of films, including the polymer according to item 12 or 13.

Item 16. A multilayer film that includes a polymer prepared from a polymerizable cholesteric liquid crystal composition and has a color flip-flop characteristic.

Item 17. A multilayer film, wherein it includes a polymer prepared from a polymerizable cholesteric liquid crystal composition and its color is changed from a hue at short-wavelengths to a hue at long-wavelengths by increasing a viewing angle from the perpendicular direction toward the horizontal direction against the plane of the multilayer film.

Item 18. A multilayer film, wherein it includes a polymer prepared from a polymerizable cholesteric liquid crystal composition and its color is changed from a hue at long-wavelengths to that at short-wavelengths by increasing the viewing angle from the perpendicular direction toward the horizontal direction against the plane of the monolayer film.

Item 19. The multilayer film according to any one of items 16 to 18, wherein the polymerizable cholesteric liquid crystal composition is a polymerizable cholesteric liquid crystal composition according to any one of items 1 to 11.

Item 20. A color material that includes the polymer according to item 12 or 13.

Item 21. Use of the polymerizable cholesteric liquid crystal composition according to any one of items 1 to 11, as an application selected from the group consisting of liquid crystal pigment, coating, spray ink, printing ink, cosmetics, an anti-counterfeit printed matter and an ornament.

Item 22. Use of the polymer according to item 12 or 13, as an application selected from the group consisting of liquid crystal pigment, coating, spray ink, printing ink, cosmetics, an anti-counterfeit printed matter and an ornament.

According to the invention, a polymerizable liquid crystal composition that is prepared from a plant-derived raw material and has a cholesteric phase at around room temperature or human body temperature can be provided, and the reflection color in the cholesteric reflection band can be adjusted over a wide range of red to purple via green and blue at around room temperature or body temperature by changing the formulation of the composition, and a film can be formed by applying the composition directly to an objective substrate, and then the cholesteric phase can be fixed.

Hereinafter, the polymerizable cholesteric liquid crystal composition and its use according to the invention are explained in detail.

The meaning of the term "liquid crystallinity" in this specification is not limited to characteristics having a liquid crystal phase, and includes also characteristics in which a compound can be used as a component of a liquid crystal composition when mixed with other liquid crystal compounds, even though the compound itself does not have a liquid crystal phase.

The compound represented by formula (a1) may be abbreviated to "the compound (a1)", and the same rules apply to compounds or groups represented by other formulas. When a compound has a plurality of Q in formula, arbitrary two Q may be the same or different. The same rules apply to other symbols such as Z.

The meaning of the phrase "arbitrary —$CH_2$— in alkylene may be replaced by —O—" is shown by way of one example. The phrase "—$C_4H_8$— group in which arbitrary —$CH_2$— is replaced by —O—" means, for example, —$C_3H_6O$—, —$CH_2$—O—$(CH_2)_2$— and —$CH_2$—O—$CH_2$—O—. In this manner, the term "arbitrary" means "at least one selected without any discrimination." In consideration of the stability of the compound, —$CH_2$—O—$CH_2$—O— in which oxygen and oxygen are nonadjacent is preferable to —$CH_2$—O—O—$CH_2$— in which oxygen and oxygen are adjacent.

[Polymerizable Cholesteric Liquid Crystal Composition]

The polymerizable cholesteric liquid crystal composition of the invention (which may be referred to simply as "liquid crystal composition of the invention") includes at least one compound selected from the group consisting of a polymerizable ester compound (1) having a residue of a hydrolysate of γ-oryzanol (A) and having a ring structure (the ring does not include an oxirane ring and an oxetane ring in this specification), a polymerizable ester compound (2) having a residue of a hydrolysate of γ-oryzanol (A) and having no ring structures, and a polymerizable ester compound (3) having a residue of a hydrogenated product of γ-oryzanol (A). The polymerizable ester compounds (1) to (3) are liquid crystalline.

The liquid crystal composition of the invention has a wide range of a cholesteric liquid crystal phase at around room temperature (from about 10° C. to about 40° C.), and a wavelength range of light reflected from the cholesteric phase can be adjusted by changing a composition ratio of each component and polymerization temperature of the composition, and then a polymer that reflects light having a color desired or light with wavelengths that is in accordance with a purpose can be formed.

<γ-Oryzanol (A)>

γ-Oryzanol is a plant-derived raw material obtained from rice bran, and the commercially available γ-oryzanol (A) is not a single compound but a mixture which contains at least one of ferulic acid esters of plant sterols and at least one of ferulic acid esters of triterpene alcohols as main components, and may be expressed as "γ-oryzanol (A)". γ-Oryzanol (A) is more specifically a mixture that contains at least one compound represented by the following formula (a1) and at least one compound represented by the following formula (a2):

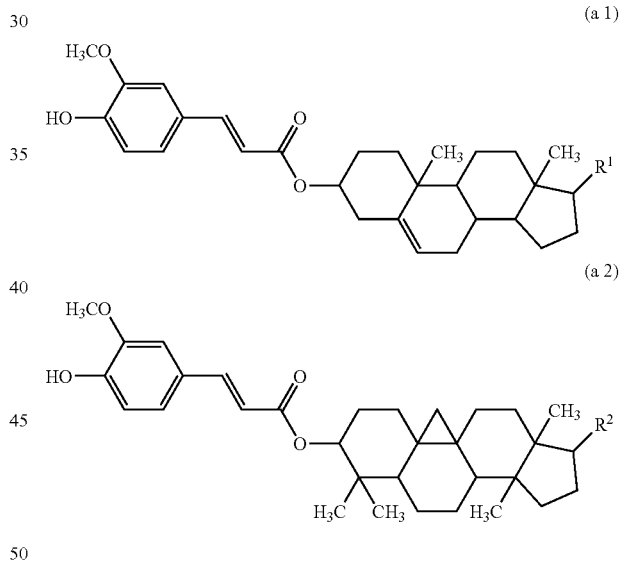

In formulas (a1) and (a2), $R^1$ is branched-chain alkyl or alkenyl having 9 or 10 carbons, and $R^2$ is branched-chain alkyl or alkenyl having 8 or 9 carbons. Examples of the alkyl or the alkenyl represented by $R^1$ include alkyl or alkenyl represented by the following formulas (R1-1) to (R1-4). Examples of the alkyl or the alkenyl represented by $R^2$ include alkyl or alkenyl represented by the following formulas (R2-1) to (R2-4).

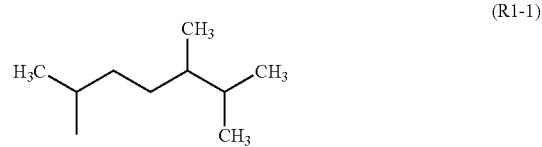

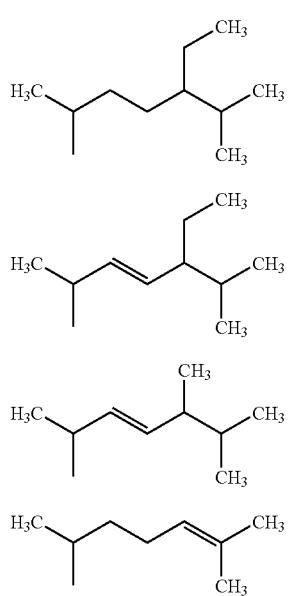
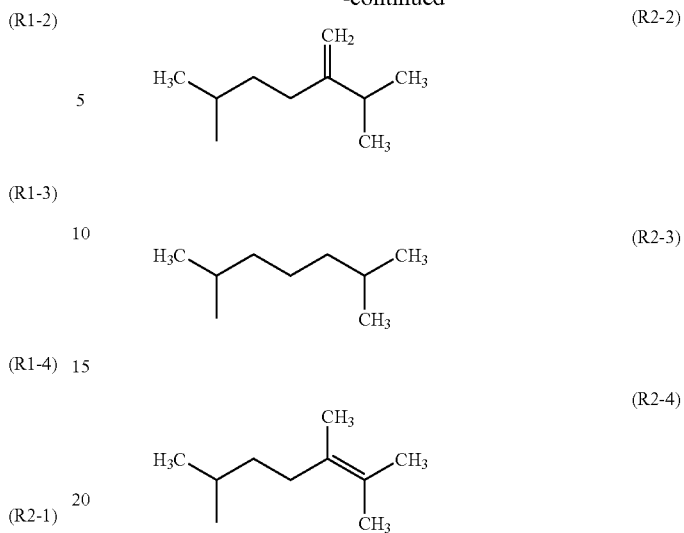
Examples of the compound (a1) include the following compounds.
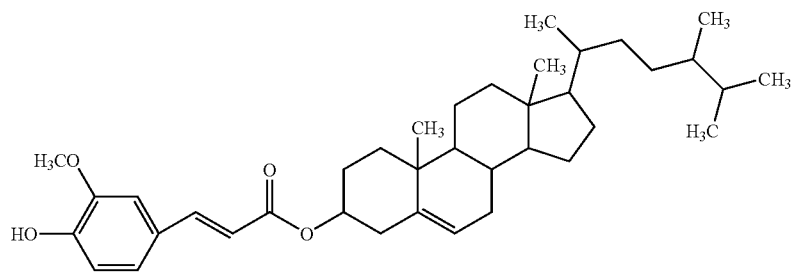
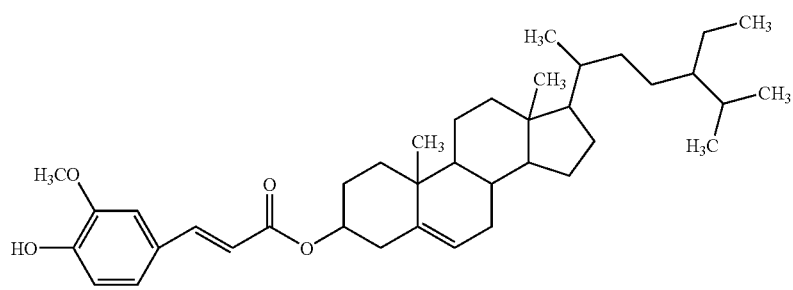
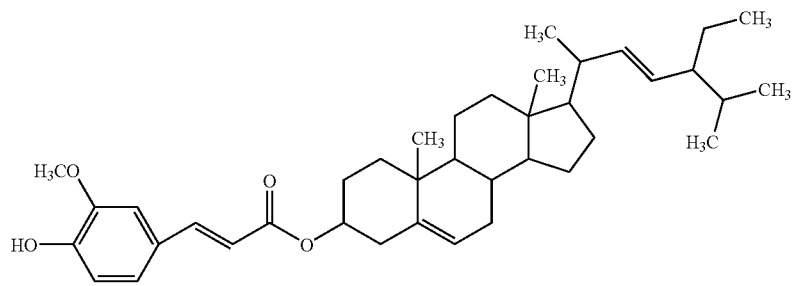

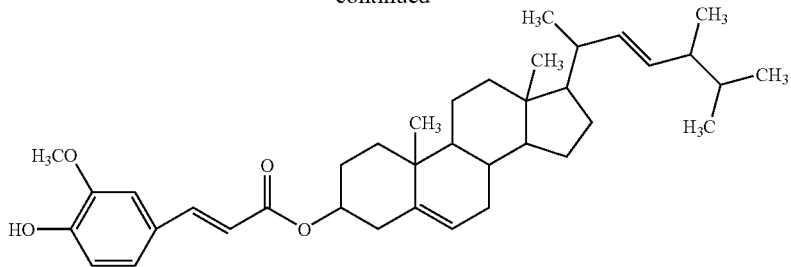

Examples of the compound (a2) include the following compounds.

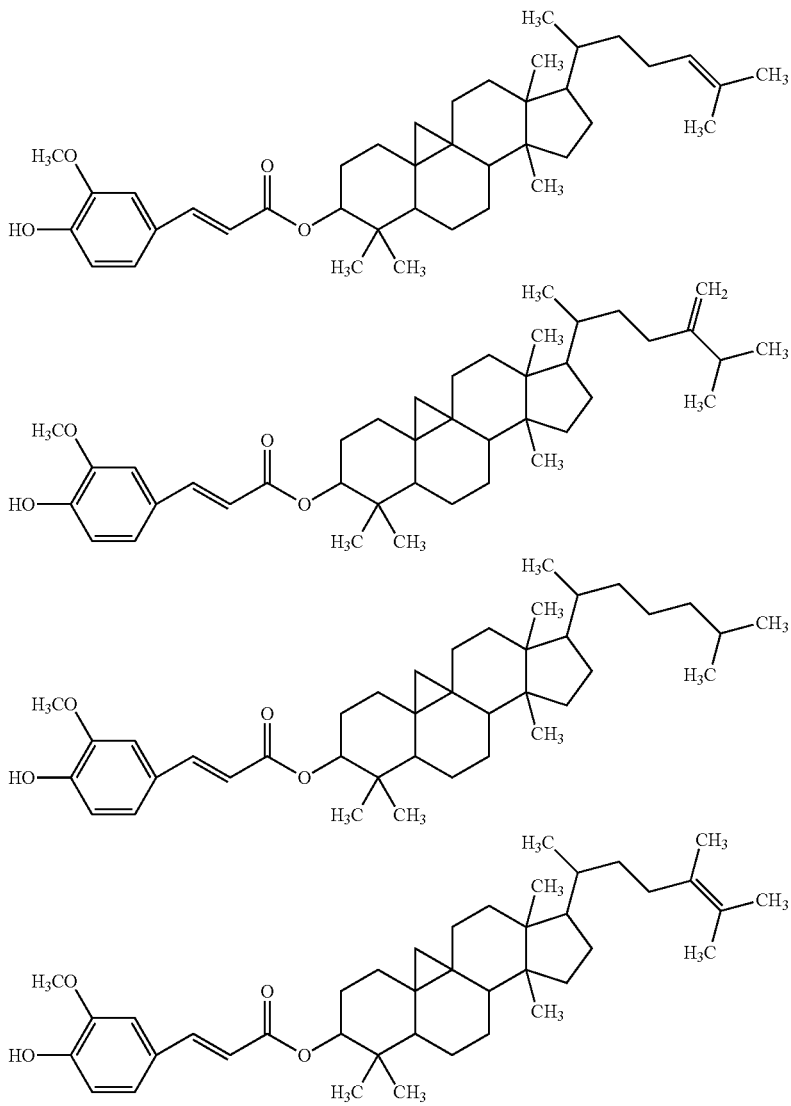

γ-Oryzanol (A) generally contains two or three components in the examples of the compound (a1) and two or three components in the examples of the compound (a2) as main components, and each component and a composition ratio may vary depending on suppliers of the raw material used. Incidentally, there are cases in which γ-oryzanol (A) contains the exemplified compound other than the main components, or cases in which γ-oryzanol (A) contains an isomer or the like other than the exemplified compounds, as a component in a small amount.

γ-Oryzanol (A) preferably contains ferulic acid esters of triterpene alcohols in an amount of preferably 60% or more by weight, more preferably 70% or more by weight, and most preferably 80% or more by weight, and in an amount of preferably 99% or less by weight, more preferably 95% or less by weight, and most preferably 90% or less by weight.

Commercially available reagents of γ-oryzanol (A) are usable, and their examples include γ-oryzanol produced by Wako Pure Chemical Industries, Ltd., Tsuno Food Industrial Co., Ltd., Tsuno Rice Fine Chemicals Co., Ltd., Riken Vitamin Co., Ltd., Oryza Oil & Fat Chemical Co., Ltd. and Okayasu Shoten Co., Ltd.

The hydrolysate of γ-oryzanol (A) is obtained by hydrolysis of γ-oryzanol (A) and is a mixture that contains at least one, and preferably two or more of plant sterols and at least one, and preferably two or more of triterpene alcohols.

Hydrolysis of γ-Oryzanol (A) can be carried out under the usual conditions according to any known methods. Specifically, a mixture of ferulic acid salt, plant sterols and triterpene alcohols is formed by the reaction of γ-oryzanol (A) in the presence of an aqueous solution of potassium hydroxide or sodium hydroxide, or in the presence of both the aqueous solution and a hydrophilic solvent such as acetone, methanol, ethanol, propanol or tetrahydrofuran, or in the presence of potassium hydroxide or sodium hydroxide that is dissolved in methanol, ethanol, propanol or the like. Subsequently, the reaction mixture is subjected to extraction with an organic solvent, and the resulting extract is neutralized, washed with water and dried over anhydrous magnesium sulfate. The target mixture of plant sterols and triterpene alcohols (hydrolysate) can be obtained by removal of the solvent.

Examples of the plant sterols which are the hydrolysate of γ-oryzanol (A) include the following compounds (a1-1) to (a1-4).

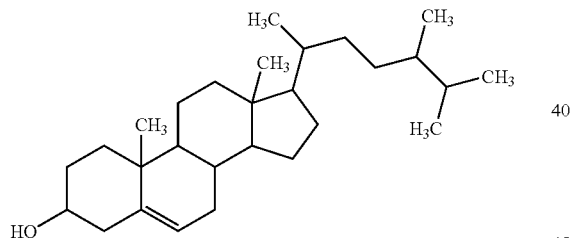

(a1-1)

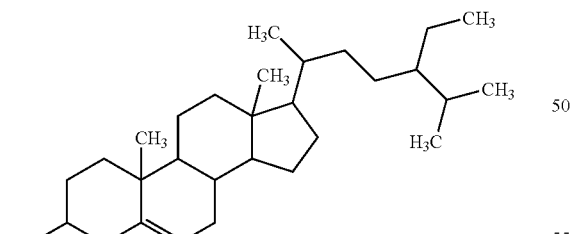

(a1-2)

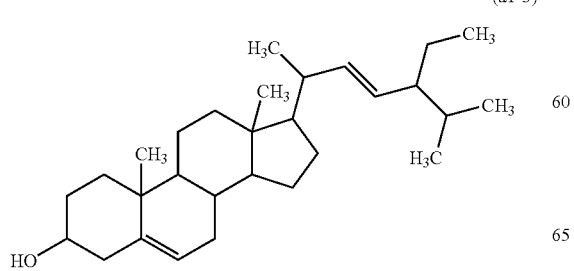

(a1-3)

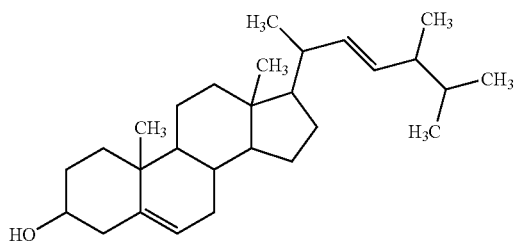

(a1-4)

The hydrolysate described above may contain an isomer other than the compounds (a1-1) to (a1-4) as plant sterols.

Examples of the triterpene alcohols which are the hydrolysate of γ-oryzanol (A) include the following compounds (a2-1) to (a2-4).

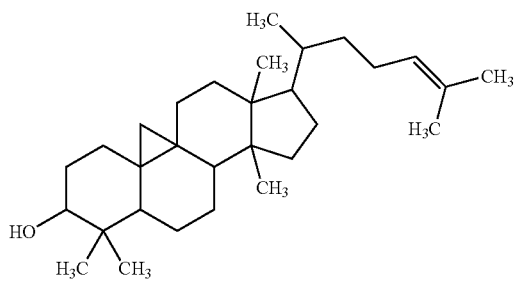

(a2-1)

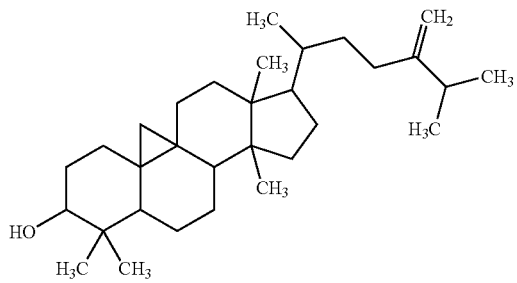

(a2-2)

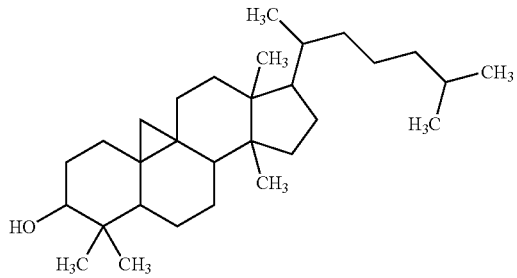

(a2-3)

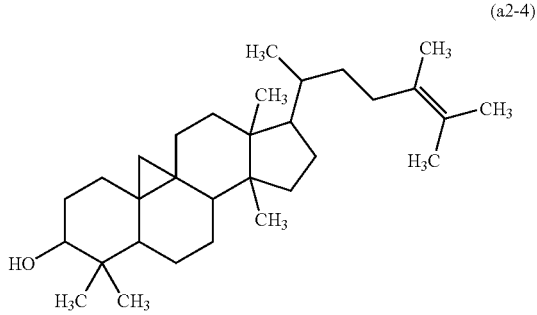

(a2-4)

The hydrolysate may contain an isomer other than the compounds (a2-1) to (a2-4) as triterpene alcohols.

The hydrogenated product of γ-oryzanol (A) can be obtained by hydrogenation under the usual conditions according to any known methods. Specific methods and conditions of hydrogenation are as follows. γ-Oryzanol (A) is dissolved in an organic solvent such as ethyl acetate, toluene or Solmix, palladium on carbon is added thereto, and then catalytic hydrogenation is carried out under normal pressure at room temperature. After the reaction, the products are extracted in an organic solvent, and the extract is washed with water and then dried over anhydrous magnesium sulfate. The target hydrogenated product of γ-oryzanol (A) can be obtained by removal of the organic solvent.

<Polymerizable Ester Compound (1)>

The polymerizable ester compound (1) is a polymerizable ester compound having a residue of the hydrolysate of γ-oryzanol (A) and having a ring structure, which is not limited to specific compounds, and is preferably the following compound represented by formula (B1)

In formula (B1), T is a residue of the hydrolysate of γ-oryzanol (A); Q is 1,4-cyclohexylene, 1,4-phenylene or 1,3-phenylene; Z is a single bond, —COO—, —OCO— or —OCOO—; m is an integer of 1 to 3, and a plurality of Q may be the same or different and a plurality of Z may be the same or different, when m is 2 or 3; X is a single bond or alkylene having 1 to 20 carbons, and in the alkylene, arbitrary —CH$_2$— may be replaced by —O—; and P is a polymerizable group represented by any one of the following formulas (P1) to (P3). The alkylene in reference to X is preferably straight-chain alkylene, and more preferably straight-chain alkylene having 2 to 10 carbons.

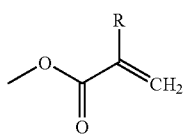

(P1)

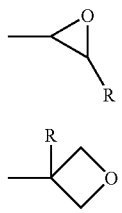

(P2)

(P3)

In formulas (P1) to (P3), R is hydrogen or alkyl having 1 to 3 carbons. The alkyl in reference to R is preferably straight-chain alkyl, and more preferably methyl, ethyl or propyl.

When the polymerizable ester compound (1) is included in the liquid crystal composition of the invention, it contributes to widen the range of a cholesteric phase in the temperature range desired.

The polymerizable ester compound (1) can be synthesized by means of a suitable combination of synthetic methods in organic chemistry, which are described in Houben-Wyle (Methoden der Organischen Chemie, Georg-Thieme Verlag, Stuttgart), Organic Reactions (John Wiley & Sons, Inc), Organic Syntheses (John Wiley & Sons, Inc), Comprehensive Organic Syntheses (Pergamon Press), and New Experimental Chemistry Course (Shin Jikken Kagaku Kouza, in Japanese title) (Maruzen) and so forth.

Specifically, the polymerizable ester compound (1) can be obtained by esterification of a polymerizable carboxylic acid compound having a ring structure with the hydrolysate of γ-oryzanol (A) under the usual conditions according to any well-known methods, or by esterification of a non-polymerizable carboxylic acid compound having a ring structure with the hydrolysate of γ-oryzanol (A) under the usual conditions according to any known methods and then by the introduction of a polymerizable group and so forth to the resulting ester.

Examples of the method of esterification generally include the condensation of a carboxylic acid with an alcohol in the presence of an acid catalyst such as sulfuric acid or p-toluenesulfonic acid, or a condensing agent such as dicyclohexylcarbodiimide (DCC), and the reaction of an acid halide with an alcohol. Specifically, a carboxylic acid chloride having a ring structure is allowed to react with a mixture of plant sterols and triterpene alcohols, which are the hydrolysate of γ-oryzanol (A), in the presence of a tertiary amine such as pyridine, triethylamine or N,N-dimethylaniline at room temperature. The reaction mixture is then extracted in an organic solvent, and the resulting extract is washed with water and then purified by means of column chromatography, giving the target ester compounds.

The polymerizable group (P1) can be introduced by the action of acrylic acid chlorides, 4-acryloyloxyalkyl chloroformate or the like on a residue of liquid crystalline ester having a hydroxy group. The polymerizable group (P2) can be introduced by oxidizing a residue of liquid crystalline ester having an unsaturated bond. The polymerizable group (P3) can be introduced by use of a known intermediate containing an oxetane ring.

Examples of the polymerizable ester compound (1) include the following compounds.

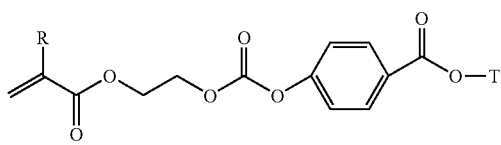

1-1

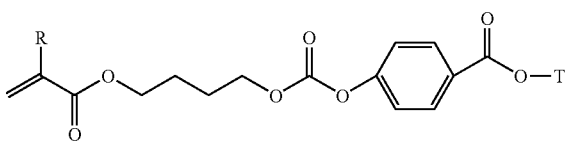

1-2

1-3
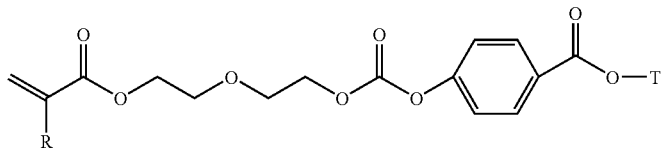
1-4
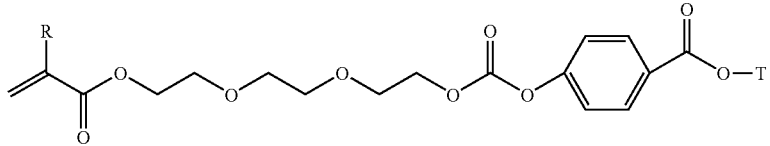
1-5
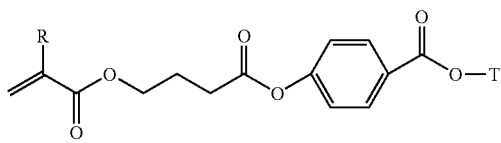
1-6
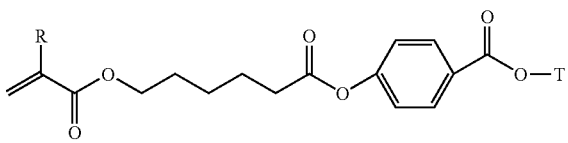
1-7
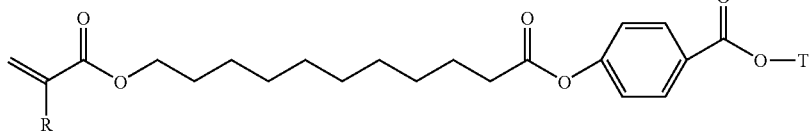
1-8
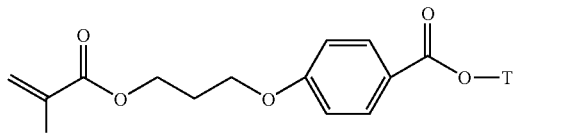
1-9
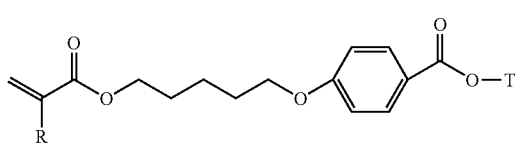
1-10
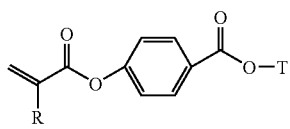
1-11
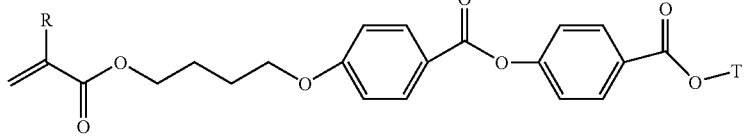
1-12
1-13
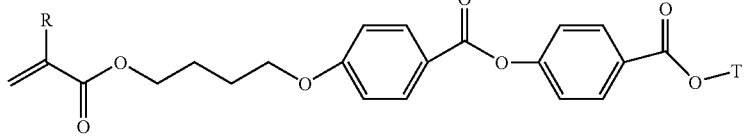
1-14
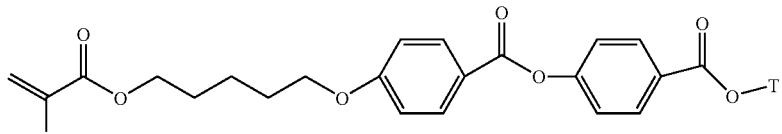
1-15
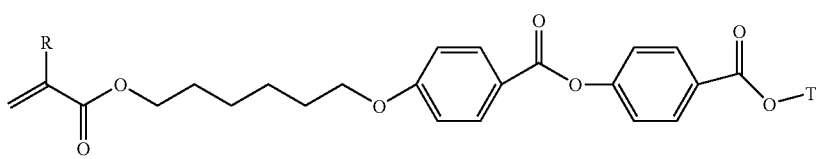
1-16

1-17
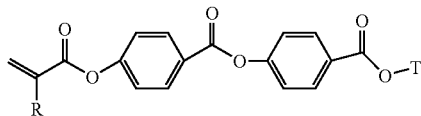

1-18
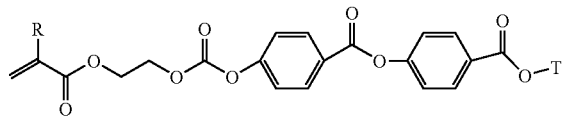

1-19
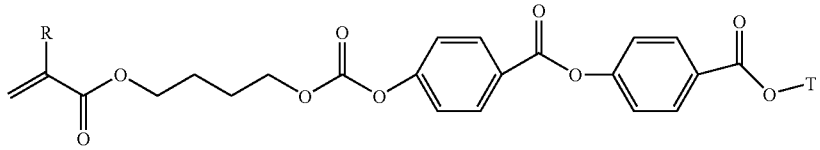

1-20
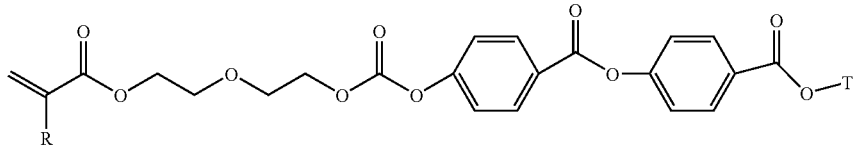

1-21
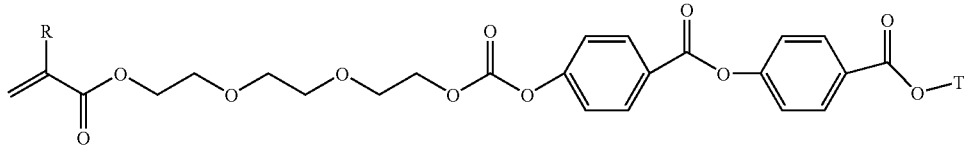

1-22
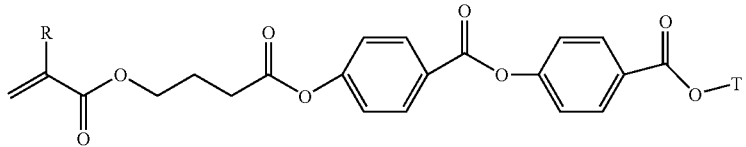

1-23
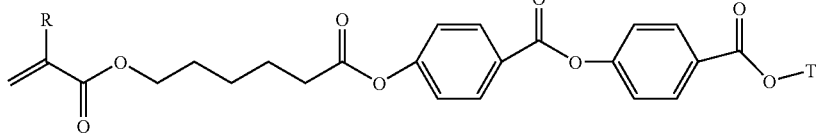

1-24
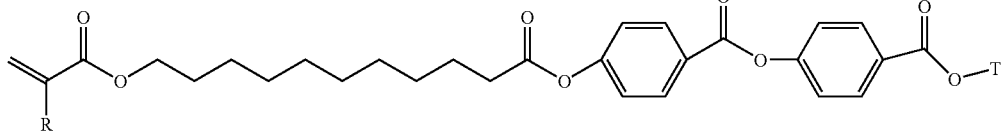

<Polymerizable Ester Compound (2)>

The polymerizable ester compound (2) is a polymerizable ester compound having a residue of the hydrolysate of γ-oryzanol (A) and having no ring structures, which is not limited to specific compounds, and is preferably the following compounds represented by formula (B2).

P—X—Y—COO-T   (B2)

In formula (B2), T, X and P have the meanings identical to those described in formula (B1), and Y is a single bond or —O—.

When the polymerizable ester compound (2) is included in the liquid crystal composition of the invention, it can adjust a pitch of the composition or prevent crystallization of the composition.

The polymerizable ester compound (2) can be synthesized by means of a suitable combination of known synthetic methods as described in the polymerizable ester compound (1). Specifically, the compound (2) can be obtained by esterification of a polymerizable carboxylic acid compound having no ring structures with the hydrolysate of γ-oryzanol (A) under the usual conditions according to any known methods or by esterification of a non-polymerizable carboxylic acid compound having no ring structures with the hydrolysate of γ-oryzanol (A) under the usual conditions according to any known methods and then by the introduction of a polymerizable group and so forth to the resulting ester.

Examples of the polymerizable ester compound (2) include the following compounds.

2-1
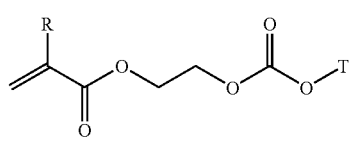

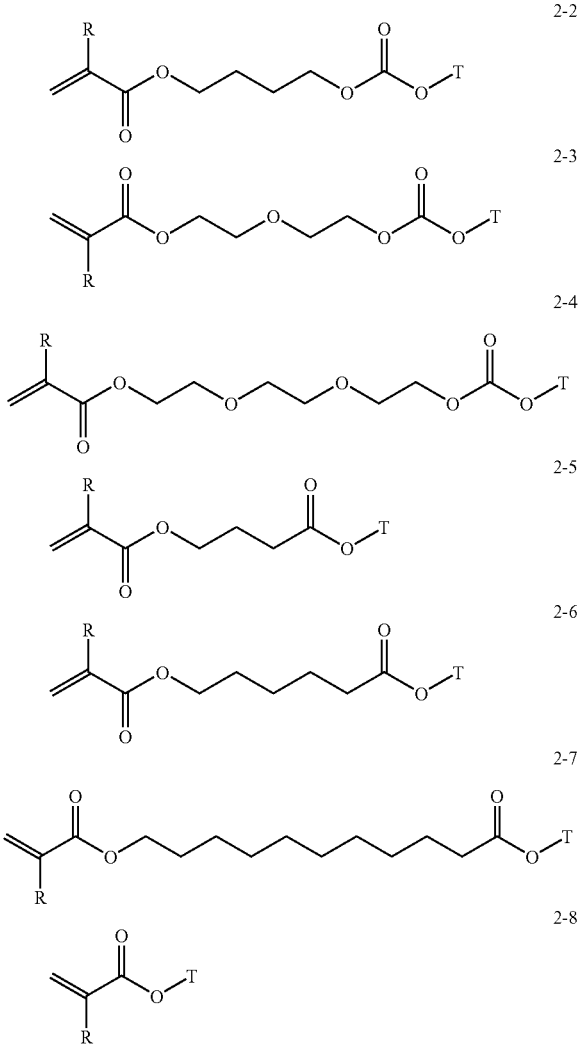

<Polymerizable Ester Compound (3)>

The polymerizable ester compound (3) is a polymerizable ester compound having a residue of the hydrogenated product of γ-oryzanol (A), which is not limited to specific compounds, and is preferably the following compounds represented by formula (B3).

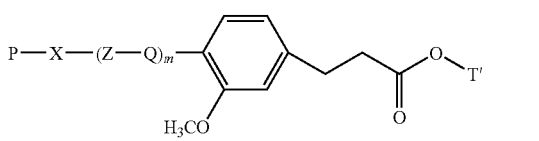

(B3)

In formula (B3), Q, Z, X and P have the meanings identical to those described in formula (B1), and T' is a residue of the hydrogenated product of γ-oryzanol (A).

When the polymerizable ester compound (3) is included in the liquid crystal composition of the invention, it can adjust a pitch of the composition or prevent crystallization of the composition.

The polymerizable ester compound (3) can be synthesized by a suitable combination of known synthetic methods similar to that described for the polymerizable ester compound (1). Specifically, the compound (3) can be obtained by esterification of a polymerizable carboxylic acid with the hydrogenated product of γ-oryzanol (A) under the usual conditions according to any known methods, or by esterification of a non-polymerizable carboxylic acid compound with the hydrogenated product of γ-oryzanol (A) under the usual conditions according to any known methods and then by the introduction of a polymerizable group and so forth to the resulting ester.

Examples of the polymerizable ester compound (3) include the following compounds.

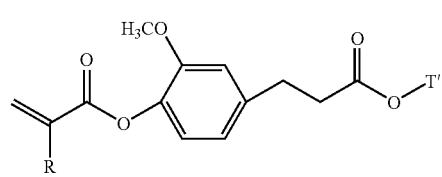

3-1

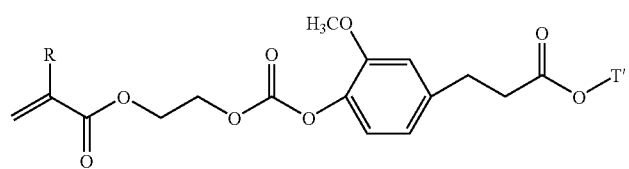

3-2

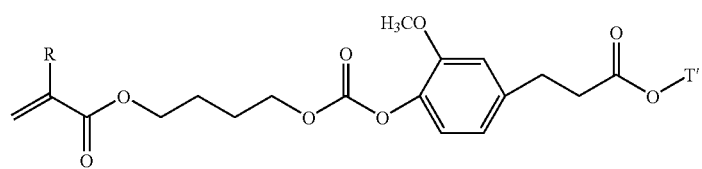

3-3

-continued 3-4
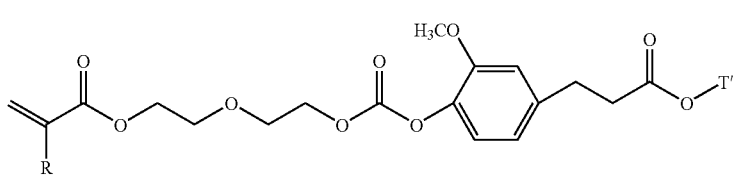

3-5
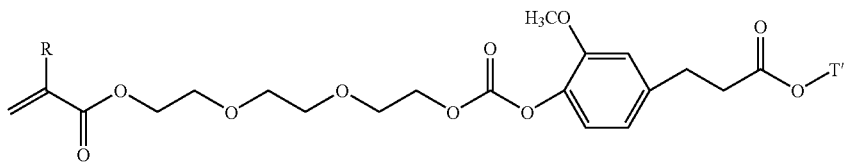

3-6
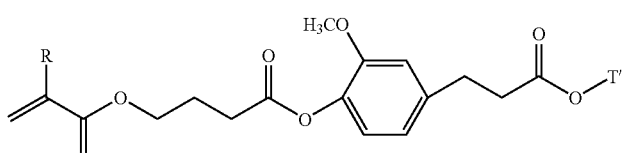

3-7
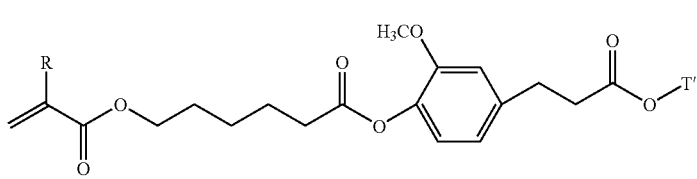

3-8
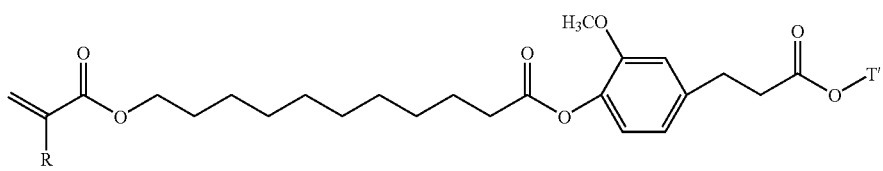

<Formulation>

The liquid crystal composition of the invention includes at least one, and preferably two or more compounds selected from the group consisting of the polymerizable ester compounds (1), (2) and (3), whereby the composition has a wide range of a cholesteric liquid crystal phase at around room temperature (from about 10° C. to about 40° C.) and can exhibit a helical pitch that is in accordance with a purpose.

It is desirable that the liquid crystal composition of the invention includes the polymerizable ester compounds (1) and (2), where more desirable polymerizable ester compound (1) is the compound (B1) wherein Q is 1,4-phenylene in formula (B1), and more desirable polymerizable ester compound (2) is the compound (B2) wherein X is alkylene having 2 to 9 carbons in formula (B2).

<Another Polymerizable Compound>

In accordance with a purpose, the liquid crystal composition of the invention may further include another polymerizable compound other than the polymerizable ester compounds (1), (2) and (3), in such an amount that does not reduce the advantages of the invention. Another polymerizable compound may be liquid crystalline or non-liquid crystalline.

Examples of another polymerizable compound having liquid crystallinity include known polymerizable compounds having liquid crystallinity and the compounds represented by formulas (M1a), (M1b), (M1c), (M2a), (M2b) and (M2c).

(M1a)
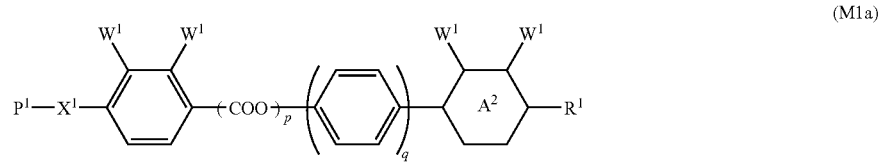

(M1b)
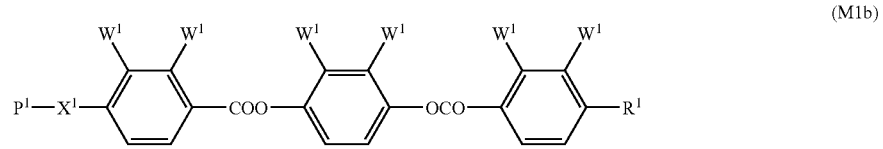

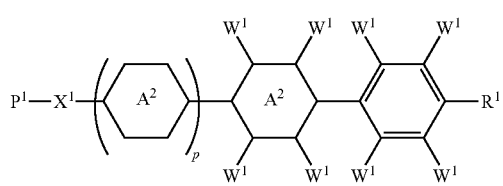

(M1c)

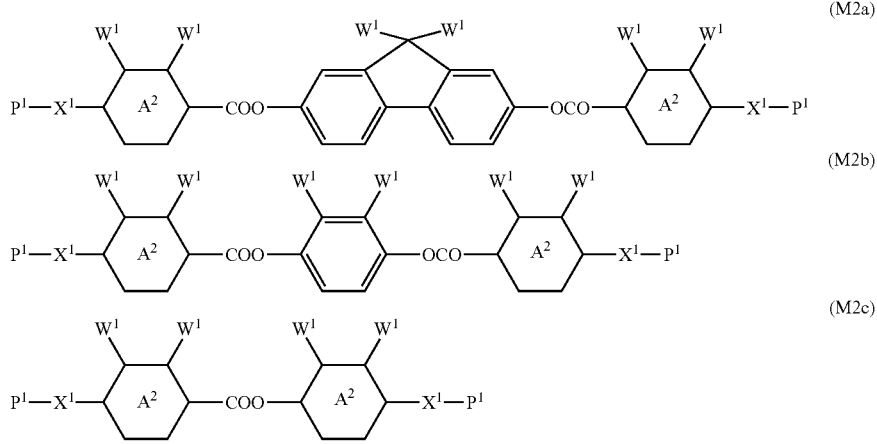

(M2a)

(M2b)

(M2c)

In formulas described above, $P^1$ is any one of polymerizable groups represented by formulas (P1) to (P3); $R^1$ is hydrogen, fluorine, chlorine, —CN or alkyl having 1 to 20 carbons, and in the alkyl, arbitrary —CH$_2$— may be replaced by —O—, —COO—, —OCO— or —OCOO— and arbitrary hydrogen may be replaced by halogen; ring $A^2$ is each independently 1,4-cyclohexylene or 1,4-phenylene; $W^1$ is each independently hydrogen, halogen, alkyl having 1 to 3 carbons or halogenated alkyl having 1 to 3 carbons; $X^1$ is each independently a single bond or alkylene having 1 to 20 carbons, and in the alkylene, arbitrary —CH$_2$— may be replaced by —O—, —COO—, —OCO— or —OCOO—; and p and q are each independently 0 or 1.

Another polymerizable compound having liquid crystallinity may be used solely or in combination of two or more of the compounds. The content of another polymerizable compound having liquid crystallinity in the liquid crystal composition of the invention may be in the range of 2% to 30% by weight, preferably in the range of 2% to 15% by weight based on the total weight (100% by weight) of the polymerizable ester compounds (1), (2) and (3). When the amount of the liquid crystal composition including another polymerizable compound having liquid crystallinity is within the range described above, a temperature at which a cholesteric phase is exhibited can also be adjusted to be at around room temperature or higher.

Materials used for a binder in coating are usable as another polymerizable compound having no liquid crystallinity. Examples of the binder include a monomeric binder, a polymeric binder and their mixture.

The monomeric binder is a compound having a polymerizable group (hereinafter the group is also referred to as "a potential bridging group"). Examples of a potential bridging group include functional groups of acrylic, methacrylic, α-halogenated acrylic, vinyl, vinyl ether, oxirane, oxetane, cyanate and isocyanate. Among these, functional groups of acrylic, methacrylic and vinylether are desirable. The monomer binder may be a compound having one potential bridging group or may be a compound having a plurality of potential bridging groups.

Examples of the monomer binder having one potential bridging group include methyl acrylate, ethyl acrylate, butyl acrylate, isobutyl acrylate, 2-ethylhexyl acrylate, methyl methacrylate, butyl methacrylate, lauryl methacrylate, styrene, acrylonitrile, acrylamide, N-methylolacrylamide, β-hydroxyethyl methacrylate, glycidyl methacrylate, acrylic acid, methacrylic acid, itaconic acid, maleic anhydride and aziridinyl methacrylate.

Examples of the monomer binder having two potential bridging groups include diacrylates or divinyl ethers or dimethacrylates of propanediol, butanediol, hexandiol, ethylene glycol, diethylene glycol, triethylene glycol and tetrapropylene glycol.

Examples of the monomeric binder having three potential bridging groups include triacrylate or, trivinyl ether or trimethacrylate of trimethylolpropane, ethoxylated trimethylolpropane having 1 to 20 ethylene oxide units, propoxylated trimethylolpropane having 1 to 20 propylene oxide units and ethoxylated-propoxylated trimethylolpropane in which the sum of an ethylene oxide unit and a propylene oxide unit is 1 to 20; glyceryl ethoxy triacrylate, glycerylpropoxytriacrylate and so forth; triacrylate or trivinyl ether or trimethacrylate of ethoxylated glycerin having 1 to 20 ethylene oxide units and propoxylated glycerin having 1 to 20 propylene oxide units.

Examples of the monomeric binder having four potential bridging groups include pentaerythritol tetraacrylate; tetraacrylate or tetravinyl ether or tetramethacrylate of ethoxylated bis-tetramethylolpropane having 1 to 20 ethylene oxide units, propoxylated bis-tetramethylolpropane having 1 to 20 propylene oxide units and ethoxylated-propoxylated bis-tetramethylolpropane in which the sum of an ethylene oxide unit and a propylene oxide unit is 1 to 20.

Examples of the monomeric binder having five potential bridging groups include dipentaerythritol pentaacrylate, ethoxylated dipentaerythritol pentaacrylate having 1 to 20 ethylene oxide units, propoxylated dipentaerythritol pentaacrylate having 1 to 20 propylene oxide units, and pentaacrylate or pentavinyl ether or pentamethacrylate of ethoxylated-propoxylated dipentaerythritol in which the sum of an ethylene oxide unit and a propylene oxide unit is 1 to 20.

Examples of the polymer binder include a (meth)acrylic oligomer, a urethane acrylate oligomer and an epoxy oligomer.

Among another polymerizable compound having no liquid crystallinity described above, a monofunctional (meth)acrylate monomer, a monofunctional (meth)acrylic oligomer, a polyfunctional (meth)acrylate monomer and a polyfunctional (meth)acrylic oligomer are more desirable.

Another polymerizable compound having no liquid crystallinity described above may be used solely or in combination of two or more of the compounds. The content of another polymerizable compound being non-liquid crystalline in the liquid crystal composition of the invention varies depending on the structure and the composition ratio of the polymerizable compound having liquid crystallinity, and is preferably 40% or less by weight, more preferably 30% or less by weight, and most preferably 20% or less by weight based on the total weight (100% by weight) of the essential components. When the content of another polymerizable compound having no liquid crystallinity is in the range described above, the liquid crystal phase of the composition is maintained without phase separation.

<Non-Polymerizable Component>

In accordance with a purpose, the liquid crystal composition of the invention may further include non-polymerizable component in such an amount that does not reduce the advantages of the invention. The non-polymerizable component may be liquid crystalline or non-liquid crystalline, and examples of the component include a non-polymerizable liquid crystal compound, body pigment, colorant, a dispersing agent, a polymerization initiator, a sensitizer, a polymerization inhibitor, an oxygen inhibitor, an antioxidant, an ultraviolet light absorbent, surfactant, an adhesive mediator, an adhesion promoter, a preservation stabilizer, an antifoaming agent and a deflocculating agent.

Examples of the non-polymerizable liquid crystal compounds are described, for example, in LiqCryst (LCI Publisher, GmbH, Hamburg, Germany) that is databases of liquid crystal compounds. The non-polymerizable liquid crystal compounds may be used solely or in combination of two or more of them.

Examples of the body pigment that is generally added to coating and so forth include barium sulfate, barium carbonate, calcium carbonate, magnesium carbonate, silica, titanium oxide, mica, sericite and talc. The body pigments may be used solely or in combination of two or more of them.

Examples of the colorant include an organic pigment that is generally added to a resin, and more specifically include a soluble azo pigment, an insoluble azo pigment, polyazo pigment, phthalocyanine, anthraquinone, thioindigo, perylene, perynone, dioxazine, quinacridone, isoindolinone, quinophthalone, diketopyrrolopyrrole, and carbon black. In these compounds, a soluble azo pigment, an insoluble azo pigment, polyazo pigment, phthalocyanine, quinacridone, dioxazine and carbon black are desirable.

As for the dispersing agents, a conventional low-molecular or high-molecular dispersing agent can be used. Examples of the low-molecular dispersing agent include stearic acid, and those of the high-molecular dispersing agent include polyurethane having a sulfonate group, a phosphate group, a phosphonate group or a carboxyl group, vinylchloride polymer having a carboxyl group, polyimine-polyester and polyetheracrylate.

The liquid crystal composition of the invention may include a conventional photopolymerization initiator in the photoradical polymerization. The wavelength of maximum absorbance in the initiator is present in the ultraviolet, near-ultraviolet or visible light region, and a polymer may be produced by irradiation of the composition at room temperature or at elevated temperature.

Examples of the photopolymerization initiator include 2,2-dimethoxy-1,2-diphenylethan-1-one (IRGACURE 651), 1-hydroxy-cyclohexylphenyl-ketone (IRGACURE 184), 2-hydroxy-2-methyl-1-phenyl-propan-1-one (DAROCURE 1173), IRGACURE 500, IRGACURE 1000, 1-[4-(2-hydroxyethoxy)-phenyl]-2-hydroxy-2-methyl-1-propan-1-one (IRGACURE 2959), 2-methyl-1-[4-(methylthio) phenyl]-2-morpholinopropan-1-one (IRGACURE 907), 2-benzyl-2-dimethylamino-1-(4-morpholinophenyl)-butanone-1 (IRGACURE 369), 2-(dimethylamino)-2-[(4-methylphenyl)methyl]-1-[4-(4-morpholin ylphenyl]-1-butanone (IRGACURE 379), IRGACURE 1800, IRGACURE 1850, DAROCURE 4265, DAROCURE 1116, IRGACURE 784, bis(2,4,6-trimethylbenzoyl)-phenylphosphine oxide (IRGACURE 819), IRGACURE 784, 1,2-octanedione-1-[4-(phenylthio)-2-(O-benzoyloxime)] (IRGACURE OXE 01), ethanone-1-[9-ethyl-6-(2-methylbenzoyl)-9H-carbazole-3-yl]-1-(O-acetyloxime) (IRGACURE OXE 02), 2-hydroxy-1-[4-[4-(2-hydroxy-2-methyl-propionyl)-benzyl]phenyl]-2-methyl-propan-1-one (IRGACURE 127) and IRGACURE 754. These are available from of Ciba Japan K. K.

Additional examples of the photopolymerization initiator include acetophenone, benzophenone, 4,4'-bis(dimethylamino)benzophenone, 3,3-dimethyl-4-methoxybenzophenone, benzyl, benzoyl, benzoin ethyl ether, benzoin butyl ether, benzoin isobutyl ether, azoisobutyronitrile, 2-chlorothioxanthone, 2,4-dimethylthioxanthone, 2,4-diisopropylthioxanthone, 2-isopropylthioxanthone, 2,4-diethylthioxanthone, methyl phenylglyoxylate, 3,3',4,4-tetra(t-butylperoxycarbonyl)benzophenone, ethyl p-dimethylaminobenzoate, 2-(dimethylaminoethyl)benzoate, isoamyl p-dimethylaminobenzoate, N,N-dimethylaminoethylmethacrylate, a mixture of benzophenone and methyltriethanolamine, a mixture of 2,2-diethylxanthone and methyl p-dimethylaminobenzoate, 2-methyl-1-[4-(methylthio)phenyl]-2-morpholinopropan-1-one, benzyl dimethyl ketal, acetophenone dimethyl ketal, 2,2-dimethoxy-2-phenylacetophenone, 2,2-diethoxy-2-phenylacetophenone, 1,1-dichloroacetophenone, diethoxyacetophenone, 2-hydroxy-2-methyl-phenylpropan-1-one, 1-hydroxycyclohexyl phenyl ketone, 2-ethylanthraquinone, 2-tertiary-butylanthraquinone, 2-chloroanthraquinone, 2-amylanthraquinone, benzophenone, 4-benzoyl-4'-methyldiphenyl sulfide, 4,4'-bis(dimethylamino)benzophenone, 2,4,6-trimethylbenzoyl-diphenylphosphine oxide and bis(2,4,6-trimethylbenzoyl)-phenylphosphine oxide.

It is desirable that the amount of the polymerization initiators is used in the range of 0.01 to 10 parts by weight based on the total amount (100 parts by weight) of compounds having unsaturated ethylene bonds capable of radical polymerization.

The liquid crystal composition of the invention may include a sensitizer together with the polymerization initiator. Examples of the sensitizer include coumarins having a substituent at the 3-position and/or at the 7-position, flavones, dibenzalacetones, dibenzalcyclohexanes, chalcones, xanthenes, thioxanthenes, porphyrins and acridines.

The liquid crystal composition of the invention may include a surfactant such as a nonionic surfactant, a cationic surfactant and an anionic surfactant, in order to improve applicability to a substrate. Specific examples of the surfactant include a nonionic surfactant of polyoxyethylene alkyl ethers such as polyoxyethylene lauryl ether, polyoxyethylene stearyl ether and polyoxyethylene oleyl ether, of polyoxyethylene aryl ethers such as polyoxyethylene octylphenyl ether and polyoxyethylene nonylphenyl ether and of polyethylene glycol dialkyl esters such as polyethylene glycol dilaurylate and polyethylene glycol distearate; a fluorinated surfactant such as FTOP-EF301, FTOP-EF303 and FTOP-EF352 (available from Shin-Akita Chemical Co., Ltd.), MEGAFACE-F171, MEGAFACE-F172 and MEGAFACE-F173 (available from Dainippon Ink and Chemicals, Inc.), FLUORAD-FC430 and FLUORAD-FC431 (available from Sumitomo 3M Ltd.), AsahiGuard-AG710, Surflon-S-382, Surflon-SC-101, Surflon-SC-102, Surflon-SC-103, Surflon-SC-104, Surflon-SC-105 and Surflon-SC-106 (available from Asahi Glass Co., Ltd.); organosiloxane polymer KP341 (available from Shin-Etsu Chemical Co., Ltd.), and an acrylic acid- or methacrylic acid-based polymer and copolymer, PolyFlow No. 57 and PolyFlow No. 95 (available from Kyoeisha Chemical Co., Ltd.). The surfactant is used in the amount of 5 parts or less by weight based on the polymer.

The liquid crystal composition of the invention may include an adhesion promoter in order to improve adhesion of the composition to a substrate applied. Examples of the adhesion promoter include vinyltrimethoxysilane, vinyltriethoxysilane, vinyltris(2-methoxyethoxy)silane, N-(2-aminoethyl)-3-aminopropyltrimethoxysilane, 3-aminopropyltrimethoxysilane, 3-glycidoxypropyltrimethoxysilane, 3-glycidoxypropyldimethoxysilane, 3-glycidoxypropylmethyldimethoxysilane, 2-(3,4-epoxycyclohexyl)ethyltrimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltrimethoxysilane.

Examples of the antioxidant include 2,2-methylene-bis(4-methyl-6-t-butylphenol) and 2,6-di-t-butyl-4-methylphenol (BHT).

Examples of the ultraviolet light absorbent include 2-(3-t-butyl-5-methyl-2-hydroxyphenyl)-5-chlorobenzotriazole and alkoxybenzophenones.

Examples of the deflocculating agent include sodium polyacrylate.

<Organic Solvent>

The liquid crystal composition of the invention may include organic solvent to dilute the composition or to improve applicability. Examples of the organic solvent include straight-chain and branched-chain esters and especially acetic acid esters, cyclic ethers, cyclic esters, alcohols, lactones, aliphatic hydrocarbons, aromatic hydrocarbon, toluene, xylene, cyclohexane, ketones, amides, N-alkylpyrrolidones, tetrahydrofuran, dioxane and methyl ethyl ketone. The organic solvents may be used solely or as a mixture of two or more of them.

<Uses>

A use of the liquid crystal composition of the invention includes general color materials such as liquid crystal pigment, coating, spraying ink and printing ink. The composition can also be used for cosmetics, an anti-counterfeit printed matter, an ornament or an optical film (for example, a polarizing plate, a compensation plate or a color filter in an optical element such as a liquid crystal display device and a holographic device).

[Polymer]

The polymer of the invention can be obtained by polymerizing the liquid crystal composition of the invention described above, and reflects light having a desired color or a desired wavelength that is in accordance with a purpose, because a cholesteric liquid crystal phase (a helical structure) of the composition is fixed by means of the polymerization. The polymerization of the composition may be thermal polymerization by means of heating, photopolymerization on irradiation with light, or their combinations.

A desirable kind of light used for the photopolymerization is ultraviolet rays, visible rays, infrared rays and so forth, and electromagnetic waves such as electron beams and X-rays may also be used. The ultraviolet rays or visible rays are usually used. The wavelengths are preferably in the range of 150 to 500 nm, more preferably in the range of 250 to 450 nm, and most preferably in the range of 300 to 400 nm. Examples of a light source include a low pressure mercury lamp (a germicidal lamp, a chemical fluorescent lamp and a black light), a high intensity discharge lamp (a high pressure mercury lamp and a metal halide lamp) and a short-arc lamp (an ultra high-pressure mercury lamp, a xenon lamp and a mercury-xenon lamp), and the high pressure mercury lamp is desirable.

The composition may be irradiated with light directly from a light source, or with light of a specific wavelength (or a specific range of wavelengths) selected by use of a light filter. The amount of irradiation energy density is preferably in the range of 2 to 5000 mJ/cm$^2$, more preferably in the range of 10 to 3000 mJ/cm$^2$, and most preferably in the range of 100 to 2000 mJ/cm$^2$. The intensity of illuminance is preferably in the range of 0.1 to 5000 mW/cm$^2$, and more preferably in the range of 1 to 2000 mW/cm$^2$.

The polymer of the invention can be obtained by applying the liquid crystal composition of the invention to the surface of a substrate directly and then polymerizing the composition. The shape of the polymer is not specially limited, and it may be a film-shaped (the form of a film), a plate-shaped and so forth and the polymer may also be molded.

In the liquid crystal composition of the invention, a wavelength range of light reflected from a cholesteric phase can be adjusted over a wide range of red to purple via green and blue by changing a combination and a composition ratio of each component, or curing temperature of the composition. Thus, the polymer that reflects light having a desired color or a wavelength depending on a purpose can be obtained without strict adjustments of temperature conditions during curing.

<Uses>

A use of the polymer of the invention includes general color materials such as liquid crystal pigment, coating, spraying ink and printing ink. The polymer can also be used for a film (including aspects of both a film such as an evaporated film that cannot be removed from its substrate and a film such as an optical film that can be handled by itself) a multilayer film, cosmetics, an anti-counterfeit printed matter, an ornament or an optical film (for example, a polarizing plate, a compensation plate or a color filter in an optical element such as a liquid crystal display device and a holographic device).

It is desirable that the multilayer film of the invention is a laminate of a plurality of films including the polymer prepared from a polymerizable cholesteric liquid crystal composition, preferably from the polymerizable cholesteric liquid crystal composition of the invention, and has a color flip-flop characteristic. The color flip-flop characteristic means an angular dependence of color in which lightness and a hue on a surface of coated film changes, depending on a viewing angle. A cholesteric liquid crystal film has a color flip-flop characteristic. However, it is difficult to adjust the hue in a monolayer film, and a monolayer does not exist that shifts especially from a hue at short-wavelengths to that at long-wavelengths by increasing a viewing angle from the perpendicular direction toward the horizontal direction against the plane of the film.

The multilayer film can be obtained by applying a first polymerizable cholesteric liquid crystal composition to a substrate, and then drying and polymerizing (curing) the first composition, forming a first layer, and on top of the first layer by applying a second polymerizable cholesteric liquid crystal composition which is different from the first composition in formulation, and then drying and polymerizing (curing) the second composition, forming a second layer, and by repeating this procedure as required.

When compositions having different pitches are cured, the multilayer film can be formed that shifts from a hue at short-wavelengths to that at long-wavelengths or from a hue at long-wavelengths to that at short-wavelengths by changing the viewing angle from the perpendicular direction toward the horizontal direction against the plane of the multilayer film.

In formation of the multilayer film, a procedure such as applying, drying and polymerizing the liquid crystal composition can be carried out under the usual conditions according to any known methods.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted, to limit the scope of the invention.

EXAMPLES

Hereafter, the invention will be explained in more detail on the basis of examples. However, the scope of the invention should not be limited to these examples.

Synthetic Example 1

Synthesis of the Polymerizable Ester Compound (1-1)

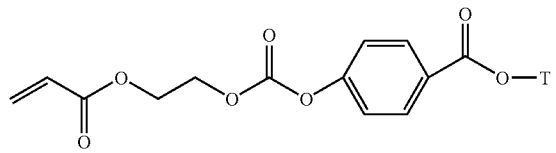
(1-1)

(1) A mixture of γ-oryzanol (50.0 g) available from Okayasu Shoten Co., Ltd., potassium hydroxide (KOH content 85%, 30 g, 0.45 mol) and ethanol (500 mL) was heated and stirred under reflux for 10 hours. Ethanol was distilled off from the mixture, the residue was extracted in ethyl acetate, and then the extract was washed with a saturated aqueous solution of sodium hydrogencarbonate and then with water. The extract was dried over magnesium sulfate and the solvent was distilled off, giving 33 g of the hydrolysate of γ-oryzanol as brown solids.

(2) 4-Acetoxybenzoic acid (1.8 g), thionyl chloride (20 mL) and toluene (15 mL) were mixed and then pyridine (0.05 mL) was added dropwise thereto, and the mixture was stirred under reflux for 2 hours. After the reaction mixture had been cooled to room temperature, toluene was added to it, and then thionyl chloride and the toluene were removed under reduced pressure. The residue was added dropwise to a mixture of the hydrolysate of γ-oryzanol (4.4 g) obtained in the step (1), pyridine (8.8 mL) and toluene (50 mL), and the mixture was stirred at room temperature for 12 hours. After the reaction, insoluble materials were filtered off. The toluene phase was washed with dilute hydrochloric acid, a saturated aqueous solution of sodium hydrogencarbonate and water in turn, and then dried over anhydrous magnesium sulfate. The solvent was removed from the organic phase under reduced pressure, and the resulting residue was purified by means of column chromatography (silica gel, eluent: toluene/ethyl acetate=100/1 in volume), giving 2.4 g of esters derived from 4-acetoxybenzoic acid and the hydrolysate of γ-oryzanol.

(3) Ammonia in water (5 mL) was added dropwise to a mixture of the esters (2.4 g) obtained in the step (2) and methanol (30 mL), and then the mixture was stirred at room temperature for 1 hour. Next, dilute hydrochloric acid was added dropwise with stirring until the mixture was acidified, and then toluene was added thereto. The toluene phase was sufficiently washed with a saturated aqueous solution of sodium hydrogencarbonate and water in turn, and dried over anhydrous magnesium sulfate. The solvent was removed from the organic phase under reduced pressure, giving 2.1 g of esters (represented by the following chemical formula) derived from 4-hydroxybenzoic acid and the hydrolysate of γ-oryzanol, which were the deacetylated compound of the esters obtained in the step (2).

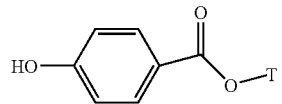

(4) The compound (i) described below (0.26 g) was added dropwise to a mixture of the esters (0.65 g) obtained in the step (3), toluene (30 mL) and pyridine (0.1 mL), and the mixture was stirred at room temperature for 5 hours. After the reaction, insoluble materials were filtered off, the toluene phase was washed with water, and dried over anhydrous magnesium sulfate. The solvent was removed under reduced pressure, and the resulting residue was purified by means of column chromatography (silica gel, eluent: toluene/ethyl acetate=50/1 in volume), giving 0.45 g of the target polymerizable ester compound (1-1).

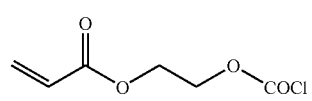
(i)

Synthetic Example 2

Synthesis of the Polymerizable Ester Compound (1-2)

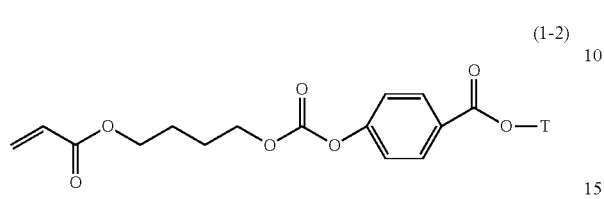

The compound (ii) (0.7 g) described below was added dropwise to a mixture of the esters (0.65 g) obtained in the step (3) in Synthetic Example 1, toluene (30 mL) and pyridine (0.1 mL), and the mixture was stirred at room temperature for 5 hours. After the reaction, insoluble materials were filtered off, and the toluene phase was washed with water and dried over anhydrous magnesium sulfate. The solvent was removed under reduced pressure, and the resulting residue was purified by means of column chromatography (silica gel, eluent: toluene/ethyl acetate=100/1 in volume), giving 0.5 g of the target polymerizable ester compound (1-2).

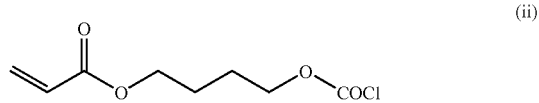

Synthetic Example 3

Synthesis of the Polymerizable Ester Compound (1-6)

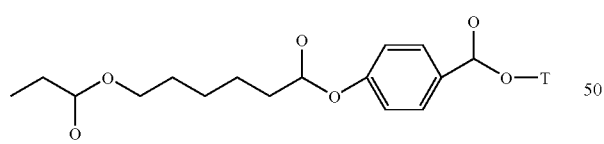

N,N'-Dicyclohexylcarbodiimide (0.3 g) in dichloromethane solution (10 mL) was added dropwise to a mixture of the esters (1.03 g) obtained in the step (3) in Synthetic Example 1, the compound (vi) (0.37 g) described below, 4-dimethylaminopyridine (0.02 g) and dichloromethane (50 mL) in an ice bath, and the mixture was stirred at room temperature for 5 hours. After the reaction, insoluble materials were filtered off, the toluene phase was washed with water, and dried over anhydrous magnesium sulfate. The solvent was removed under reduced pressure, and the resulting residue was purified by means of column chromatography (silica gel, eluent: toluene/ethyl acetate=100/1 in volume), giving 0.49 g of the target polymerizable ester compound (1-6).

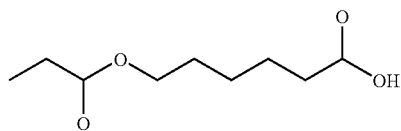

Synthetic Example 4

Synthesis of the Polymerizable Ester Compound (2-1)

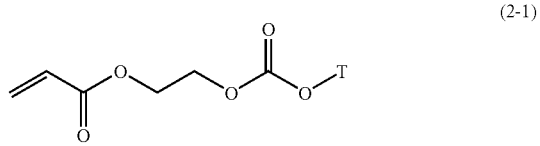

The compound (i) (0.49 g) described above was added dropwise to a mixture of the hydrolysate of γ-oryzanol (1.1 g, 2.5 mmol) obtained in the step (1) in Synthetic Example 1, pyridine (0.22 mL) and toluene (50 mL), and the mixture was stirred at room temperature for 4 hours. After the reaction, insoluble materials thus deposited were removed by filtration, and the filtrate was washed with water, dried over magnesium sulfate, and then the solvent was distilled off. The resulting residue was purified by means of column chromatography (silica gel, eluent: toluene/ethyl acetate=50/1 in volume), giving 0.81 g of the target polymerizable ester compound (2-1).

Synthetic Example 5

Synthesis of the Polymerizable Ester Compound (2-2)

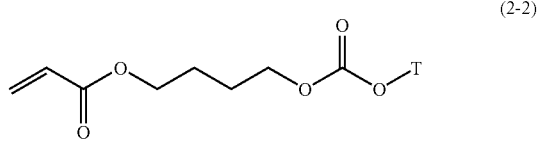

The compound (ii) (1.1 g, 5.5 mmol) described above was added dropwise to a mixture of the hydrolysate of γ-oryzanol (2.2 g, 5 mmol) obtained in the step (1) of Synthetic Example 1, pyridine (0.44 mL) and toluene (50 mL), and the mixture was stirred at room temperature for 3 hours. After the reaction, insoluble materials thus deposited were removed by filtration, and the filtrate was washed with water, dried over magnesium sulfate, and then the solvent was distilled off. The resulting residue was purified by means of column chromatography (silica gel, eluent: toluene/ethyl acetate=50/1 in volume), giving 1.8 g of the target polymerizable ester compound (2-2).

Synthetic Example 6

Synthesis of the Polymerizable Ester Compound (2-4)

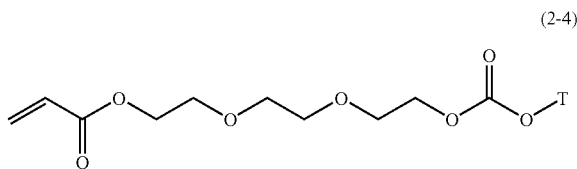

(2-4)

The compound (iv) (0.44 g) described below was added dropwise to a mixture of the hydrolysate of γ-oryzanol (0.8 g) obtained in the step (1) of Synthetic Example 1, pyridine (0.16 mL) and toluene (50 mL), and the mixture was stirred at room temperature for 4 hours. After the reaction, insoluble materials thus deposited were removed by filtration, and the filtrate was washed with water dried over magnesium sulfate, and then the solvent was distilled off. The resulting residue was purified by means of column chromatography (silica gel, eluent: toluene/ethyl acetate=50/1 in volume), giving 0.6 g of the target polymerizable ester compound (2-4).

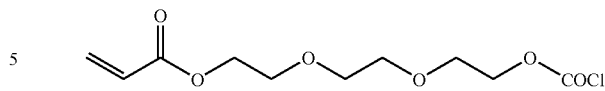

(iv)

Example 1

A polymerizable liquid crystal composition was prepared by mixing the polymerizable ester compounds (1-2) (33 parts by weight) obtained in Synthetic Example 2 and the polymerizable ester compounds (2-2) (67 parts by weight) obtained in Synthetic Example 5. The resulting composition showed a reflection color of blue at room temperature (23° C.) and at 30° C., and showed a reflection color of green at 35° C. The reflection color was determined by means of visual observation. The results are shown in Table 1-1.

Examples 2 to 21

The polymerizable liquid crystal compositions having formations shown in Table 1-1 and Table 1-2 were prepared and reflection colors were evaluated in a method similar to that described in Example 1. Results are summarized in Table 1-1 and Table 1-2.

TABLE 1-1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Formuration (parts by weigt) | Polymerizable ester compound (1-1) | | | | | | | | 87 | 85 | 37 |
| | Polymerizable ester compound (1-2) | 33 | 40 | 50 | 83 | 42 | 34 | 28 | | | |
| | Polymerizable ester compound (1-6) | | | | | | | | | | |
| | Polymerizable ester compound (2-1) | | | | | | | | | | |
| | Polymerizable ester compound (2-2) | 67 | 60 | 50 | | | | | 13 | 15 | 63 |
| | Polymerizable ester compound (2-4) | | | | 17 | 58 | 66 | 72 | | | |
| Reflection color | Temperature range (° C.) Color | 23-44 blue-green | 30-52 green-orange | 44-63 red | 32-42 colorless | 45-65 red | 23-42 blue-colorless | 36-39 colorless | 33-44 red | 30-39 red | 35-39 red |

TABLE 1-2

| | | Examples | | | | | | | | | |
|---|---|---|---|---|---|---|---|---|---|---|---|
| | | 11 | 12 | 13 | 14 | 15 | 16 | 17 | 18 | 19 | 20 | 21 |
| Formuration (parts by weigt) | Polymerizable ester compound (1-1) | 34 | | 23 | 16 | 13 | 26 | 15 | | 17 | | |
| | Polymerizable ester compound (1-2) | | 35 | 10 | 16 | 25 | 9 | 19 | 33 | | | |
| | Polymerizable ester compound (1-6) | | | | | | | | | 15 | 33 | 35 |
| | Polymerizable ester compound (2-1) | | | | | | | | 33 | 32 | 34 | 37 |
| | Polymerizable ester compound (2-2) | 66 | 35 | 67 | 68 | 32 | 55 | 38 | 34 | 36 | 33 | 29 |
| | Polymerizable ester compound (2-4) | | 30 | | | 30 | 10 | 28 | | | | |

TABLE 1-2-continued

| | | Examples | | | | | | | | | |
|---|---|---|---|---|---|---|---|---|---|---|---|
| | | 11 | 12 | 13 | 14 | 15 | 16 | 17 | 18 | 19 | 20 | 21 |
| Reflection color | Temperature range (° C.) | room temp.-25 | 33-44 | 30-33 | 30-38 | 33-34 | 37-48 | 30-38 | 27-38 | room temp.-43 | room temp.-38 | 35-43 |
| | Color | colorless | green | orange-red | green | red | green-red | green | orange-red | orange-red | orange-red | green-red |

Example 22

A toluene solution containing the polymerizable liquid crystal composition prepared in Example 1 (25% by weight) and a polymerization initiator (IRGACURE 907; 5% by weight) was applied to a rubbed TAC film (FUJITACK T40UZ, 39 μm in thickness, made by Fuji Photo Film Co., Ltd.) by use of a Baker applicator. The film was dried for 2 minutes at room temperature, and then heated in an oven for 3 minutes at 80° C., evaporating the solvent. Subsequently, a first cholesteric liquid crystal layer was formed by polymerizing the composition on irradiation with ultraviolet light (the integrated quantity of light is 490 mJ/cm$^3$) under a nitrogen atmosphere. A multilayer film was obtained by forming a second cholesteric liquid crystal layer prepared from a toluene solution containing the polymerizable liquid crystal composition prepared in Example 5 (25% by weight) and a polymerization initiator (IRGACURE 907; 5% by weight) on the first layer in a manner similar to that for the first layer. The film thickness per one layer was 25 μm (before drying) and 4 μm (after curing).

A hue was green when the resulting multilayer film was observed perpendicularly against the plane of the film and the hue changed to red when the film was inclined and observed obliquely.

Example 23

A multilayer film was formed in a manner similar to that described in Example 22, except for replacement of the polymerizable liquid crystal composition used for the formation of the second liquid crystal layer in Example 5 with that in Example 2. A hue was orange when the resulting multilayer film was observed perpendicularly against the plane of the film, and the hue changed to blue when the film was inclined and observed obliquely.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A polymerizable cholesteric liquid crystal composition that comprises at least one compound selected from the group consisting of a polymerizable ester compound (1) having a residue of a hydrolysate of γ-oryzanol (A) and having a ring structure, a polymerizable ester compound (2) having a residue of a hydrolysate of γ-oryzanol (A) and having no ring structures, and a polymerizable ester compound (3) having a residue of a hydrogenated product of γ-oryzanol,
   wherein the γ-oryzanol (A) is a mixture containing at least one of ferulic acid esters of plant sterols and at least one of ferulic acid esters of triterpene alcohols, and
   the hydrolysate of γ-oryzanol (A) is a mixture containing at least one of plant sterols and at least one of triterpene alcohols.

2. The polymerizable cholesteric liquid crystal composition according to claim 1, wherein the polymerizable ester compound (1) is represented by the following formula (B1), the polymerizable ester compound (2) is represented by the following formula (B2), and the polymerizable ester compound (3) is represented by the following formula (B3);

P—X—(Z-Q)$_m$-COO-T  (B1)

wherein T is a residue of the hydrolysate of γ-oryzanol (A); Q is 1,4-cyclohexylene, 1,4-phenylene or 1,3-phenylene; Z is a single bond, —COO—, —OCO— or —OCOO—; m is an integer of 1 to 3, and a plurality of Q may be the same or different and a plurality of Z may be the same or different when m is 2 or 3; X is a single bond or alkylene having 1 to 20 carbons and an arbitrary —CH$_2$— in the alkylene may be replaced by —O—; and P is a polymerizable group represented by any one of the following formulas (P1) to (P3):

(P1)

(P2)

(P3)

wherein R is hydrogen or alkyl having 1 to 3 carbons;

P—X—Y—COO-T  (B2)

wherein T, X and P have the meanings identical to those described in formula (B1) above and Y is a single bond or —O—;

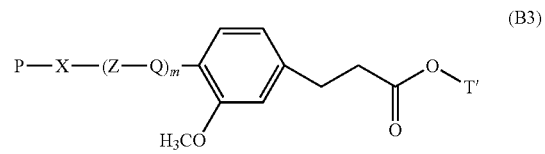

(B3)

wherein Q, Z, X and P have the meanings identical to those described in formula (B1) above and T' is a residue of the hydrogenated product of γ-oryzanol (A).

3. The polymerizable cholesteric liquid crystal composition according to claim 1, comprising at least two compounds selected from the group of the polymerizable ester compound (1), the polymerizable ester compound (2) and the polymerizable ester compound (3).

4. The polymerizable cholesteric liquid crystal composition according to claim 1, comprising the polymerizable ester compound (1) and the polymerizable ester compound (2).

5. The polymerizable cholesteric liquid crystal composition according to claim 2, wherein it comprises the polymerizable ester compound (1) and the polymerizable ester compound (2), and Q in formula (B1) is 1,4-phenylene.

6. The polymerizable cholesteric liquid crystal composition according to claim 5, wherein X in formula (B2) is alkylene having 2 to 9 carbons.

7. The polymerizable cholesteric liquid crystal composition according to claim 1, wherein the γ-oryzanol (A) is a mixture containing at least one of compounds represented by the following formula (a1) and at least one of compounds represented by the following formula (a2):

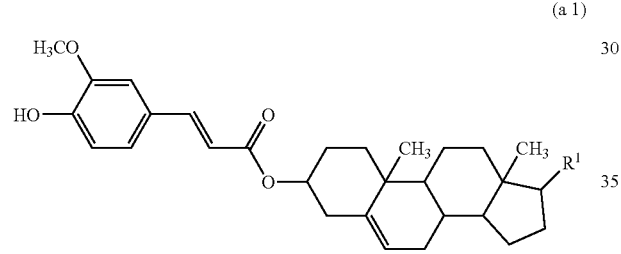
(a1)

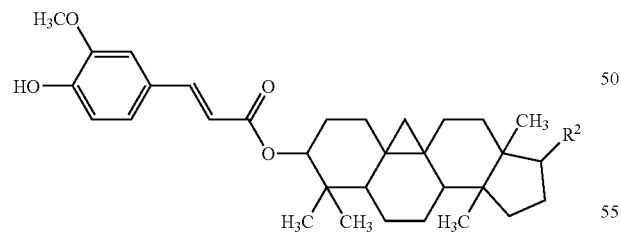
(a2)

wherein $R^1$ is branched-chain alkyl or alkenyl having 9 or 10 carbons and $R^2$ is branched-chain alkyl or alkenyl having 8 or 9 carbons.

8. The polymerizable cholesteric liquid crystal composition according to claim 1, wherein the hydrolysate of γ-oryzanol (A) is a mixture containing at least one of plant sterols selected from the group of the following formulas (a1-1) to (a1-4) and at least one of triterpene alcohols selected from the group of the following formulas (a2-1) to (a2-4).

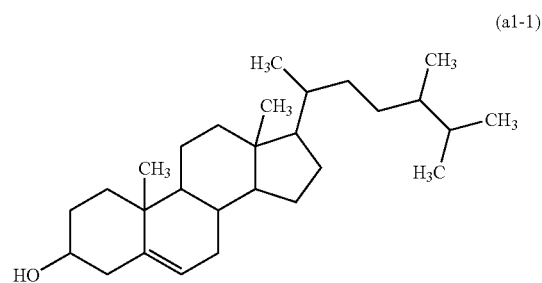
(a1-1)

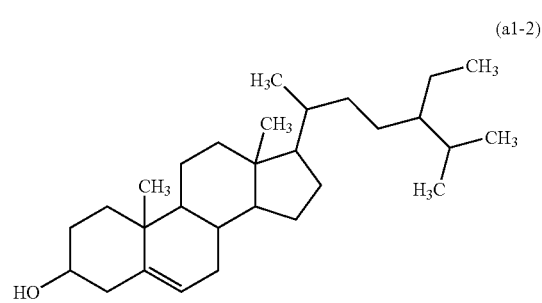
(a1-2)

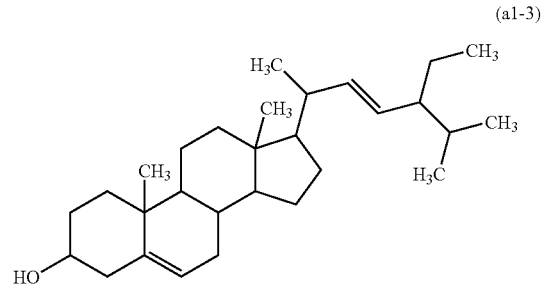
(a1-3)

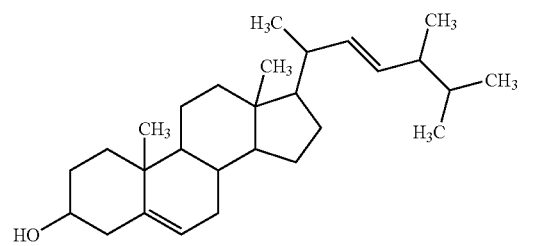
(a1-4)

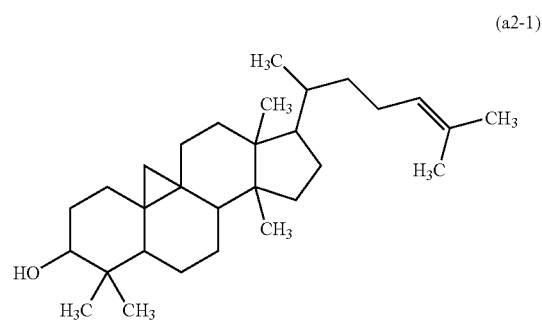
(a2-1)

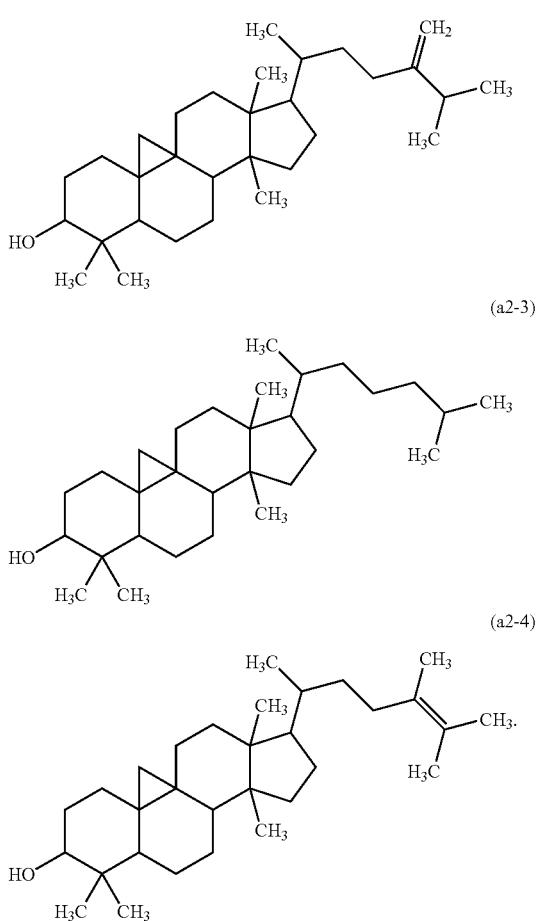

9. The polymerizable cholesteric liquid crystal composition according to claim 1, further comprising a polymerizable liquid crystal compound other than the polymerizable ester compounds (1), (2) and (3).

10. The polymerizable cholesteric liquid crystal composition according to claim 1, further comprising a non-liquid crystalline polymerizable compound.

11. The polymerizable cholesteric liquid crystal composition according to claim 10, wherein the non-liquid crystalline polymerizable compound is at least one compound selected from the group consisting of a monofunctional (meth)acrylic monomer, a monofunctional (meth)acrylic oligomer, a polyfunctional (meth)acrylic monomer and a polyfunctional (meth)acrylic oligomer.

12. A polymer formed by means of polymerization of a polymerizable cholesteric liquid crystal composition according to claim 1.

13. The polymer according to claim 12 that exhibits a cholesteric liquid crystal phase.

14. A film that comprises the polymer according to claim 12.

15. A multilayer film formed by laminating a plurality of films, comprising the polymer according to claim 12.

16. A multilayer film that comprises a polymer prepared from a polymerizable cholesteric liquid crystal composition and has a color flip-flop characteristic, wherein the polymerizable cholesteric liquid crystal composition is a polymerizable cholesteric liquid crystal composition according to claim 1.

17. A multilayer film, wherein it comprises a polymer prepared from a polymerizable cholesteric liquid crystal composition and its color is changed from a hue at short-wavelengths to a hue at long-wavelengths by increasing a viewing angle from the perpendicular direction toward the horizontal direction against the plane of the multilayer film, wherein the polymerizable cholesteric liquid crystal composition is a polymerizable cholesteric liquid crystal composition according to claim 1.

18. A multilayer film, wherein it comprises a polymer prepared from a polymerizable cholesteric liquid crystal composition and its color is changed from a hue at long-wavelengths to that at short-wavelengths by increasing the viewing angle from the perpendicular direction toward the horizontal direction against the plane of the monolayer film, wherein the polymerizable cholesteric liquid crystal composition is a polymerizable cholesteric liquid crystal composition according to claim 1.

19. A color material that comprises the polymer according to claim 12.

* * * * *